US009842102B2

(12) United States Patent
Salome et al.

(10) Patent No.: US 9,842,102 B2
(45) Date of Patent: Dec. 12, 2017

(54) AUTOMATIC ONTOLOGY GENERATION FOR NATURAL-LANGUAGE PROCESSING APPLICATIONS

(71) Applicant: Oracle International Corporation, Redwood Shores, CA (US)

(72) Inventors: Margaret Salome, Amsterdam (NL); Fabrice Nauze, Amsterdam (NL); Christian Kissig, Amsterdam (NL); Maria Begona Villada-Moiron, Almere (NL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/793,701

(22) Filed: Jul. 7, 2015

(65) Prior Publication Data

US 2016/0132482 A1 May 12, 2016

Related U.S. Application Data

(60) Provisional application No. 62/077,868, filed on Nov. 10, 2014, provisional application No. 62/077,887, filed on Nov. 10, 2014.

(51) Int. Cl.
*G06F 17/27* (2006.01)
*G06F 17/28* (2006.01)
*G06F 17/30* (2006.01)

(52) U.S. Cl.
CPC ........ *G06F 17/277* (2013.01); *G06F 17/2735* (2013.01); *G06F 17/2755* (2013.01);
(Continued)

(58) Field of Classification Search
CPC ............. G06F 17/277; G06F 17/30734; G06F 17/2775; G06F 17/2735; G06F 17/28; G06F 17/2755
(Continued)

(56) References Cited

U.S. PATENT DOCUMENTS

| 7,797,303 B2 | 9/2010 | Roulland et al. |
| 8,204,751 B1 * | 6/2012 | Di Fabbrizio ........ G06F 17/271 |
| | | 704/256 |

(Continued)

FOREIGN PATENT DOCUMENTS

| EP | 927939 A1 | 7/1999 |
| WO | 2016077015 | 5/2016 |
| WO | 2016077016 | 5/2016 |

OTHER PUBLICATIONS

Bretschneider, et al. "Corpus-based Translation of Ontologies for Improved Multilingual Semantic Annotation", Proceedings of the third workshop on semantic web and information extraction, Aug. 24, 2014, pp. 1-8.
(Continued)

*Primary Examiner* — Houshang Safaipour
*Assistant Examiner* — Bharatkumar S Shah
(74) *Attorney, Agent, or Firm* — Kilpatrick Townsend & Stockton LLP

(57) ABSTRACT

A method of generating ontologies for a Virtual Assistant across different languages may include extracting a plurality of tokens in a first language from a plurality of web resources in a web domain that includes the Virtual Assistant. The web resources may be made available in a first language and a second language. The method may also include determining a first part-of-speech (POS) for each of the plurality of tokens, where the first POS may be specific to the first language. The method may additionally include mapping the first POS to a second POS from a standardized
(Continued)

set of POS's that are general across the first language and the second language, and generating a plurality of lemmas from the plurality of tokens. The method may further include displaying a network representing the ontology.

18 Claims, 15 Drawing Sheets

(52) U.S. Cl.
CPC .......... *G06F 17/2775* (2013.01); *G06F 17/28* (2013.01); *G06F 17/30734* (2013.01)

(58) Field of Classification Search
USPC .......................................................... 704/9
See application file for complete search history.

(56) References Cited

U.S. PATENT DOCUMENTS

| | | | |
|---|---|---|---|
| 8,423,350 B1 | 4/2013 | Chandra et al. | |
| 9,678,946 B2 | 6/2017 | Nauze et al. | |
| 2006/0122834 A1* | 6/2006 | Bennett | G10L 15/1822 704/256 |
| 2007/0130194 A1 | 6/2007 | Kaiser | |
| 2011/0087670 A1 | 4/2011 | Jorstad et al. | |
| 2013/0260358 A1* | 10/2013 | Lorge | G06F 17/30734 434/362 |
| 2014/0278362 A1 | 9/2014 | Gerken, III et al. | |
| 2015/0309992 A1 | 10/2015 | Visel | |
| 2015/0347543 A1 | 12/2015 | Sinha et al. | |
| 2016/0132484 A1 | 5/2016 | Nauze et al. | |
| 2016/0132487 A1 | 5/2016 | Nauze et al. | |
| 2016/0163312 A1* | 6/2016 | Henton | G10L 15/22 704/270.1 |
| 2016/0188570 A1* | 6/2016 | Lobez Comeras | G06F 17/28 704/9 |
| 2016/0342589 A1 | 11/2016 | Brugger et al. | |

OTHER PUBLICATIONS

Espinoza, et al. "Ontology Localization", Proceedings of the Fifth International Conference on Knowledge Capture, K-Cap-09, Sep. 4, 2009, p. 33.
Vossen, et al. "KYOTO: an open platform for mining facts" In: "Handbook of Research on Culturally-Aware Information Technology", Aug. 31, 2010, IGI Global, 1-10.
International Search Report and Written Opinion of PCT/US2015/055490 dated Jan. 21, 2016, all pages.
International Search Report and Written Opinion of PCT/US2015/055489 dated Jan. 25, 2016, all pages.
U.S. Appl. No. 14/793,658, Notice of Allowance dated Oct. 17, 2016, 8 pages.
U.S. Appl. No. 14/793,658, Non-Final Office Action dated May 5, 2016, 7 pages.
U.S. Appl. No. 14/793,677, Non-Final Office Action dated Sep. 20, 2016, 5 pages.
U.S. Appl. No. 14/793,677, Notice of Allowance dated Feb. 17, 2017, 8 pages.
International Application No. PCT/US2015/055489, International Preliminary Report on Patentability dated May 26, 2017, 10 pages.
International Application No. PCT/US2015/055490, International Preliminary Report on Patentability dated May 26, 2017, 9 pages.

\* cited by examiner

| Selected | POS | Orig. Text | Lemma | Stem | Features | Freq | Lang | Default |
|---|---|---|---|---|---|---|---|---|
| ☒ | N | Oracle | oracle | oracle | | 31 | American | ☒ |
| ☒ | Punct | . | . | . | | 27 | American | ☒ |
| ☒ | Conj | and | and | and | coord | 18 | American | ☒ |
| ☒ | Det | the | the | the | | 15 | American | ☒ |
| ☒ | Prep | to | to | to | | 14 | American | ☒ |
| ☒ | Prep | for | for | for | | 14 | American | ☐ |
| ☐ | Punct | > | > | > | | 14 | American | ☒ |
| ☒ | N | Register | register | register | | 10 | American | ☒ |
| ☒ | V | Register | register | register | | 10 | American | ☐ |
| ☐ | N | Java | java | java | | 10 | American | ☒ |
| ☒ | V | Learn | learn | learn | | 10 | American | ☒ |
| ☒ | N | Support | support | support | | 8 | American | ☒ |
| ☒ | V | Support | support | support | | 8 | American | ☐ |
| ☐ | Punct | . | . | . | | 8 | American | ☒ |
| ☒ | N | now | now | now | | 7 | American | ☐ |
| ☐ | Adv | now | now | now | | 7 | American | ☒ |
| ☒ | N | Cloud | cloud | cloud | | 7 | American | ☐ |
| ☐ | V | Cloud | cloud | cloud | | 7 | American | ☒ |
| ☒ | V | See | see | see | | 7 | American | ☒ |
| ☒ | Adv | all | all | all | | 6 | American | ☐ |
| ☐ | Pro | all | all | all | | 6 | American | ☒ |
| ☒ | Det | all | all | all | | 6 | American | ☒ |
| ☒ | Adv | About | about | about | | 6 | American | ☐ |
| ☐ | Prep | About | about | about | | 6 | American | ☒ |
| ☒ | Adj | more | more | more | qu | 6 | American | ☐ |
| ☐ | Adv | more | more | more | qu | 6 | American | ☐ |
| ☐ | Pro | more | more | more | qu | 6 | American | ☐ |

FIG. 6

| AMERICAN | | | | | | | |
|---|---|---|---|---|---|---|---|
| | | | Select/Deselect All | Add | Insert | Delete | Purge | Filter |
| Sel | Cat | PoS | MWU PoSs | Type | Original Text | Lemma | Stem |
| ☒ | N | N | N,N | 2-ngram | Oracle Applications | oracle_application | oracle application |
| ☒ | N | N | N,UNK | 2-ngram | Oracle RightNow | oracle_rightnow | oracle rightnow |
| ☒ | N | N | N,UNK,N | 3-ngram | Oracle RightNow Web | oracle_rightnow_web | oracle rightnow w... |
| ☒ | N | N | N,UNK,N,N | 4-ngram | Oracle RightNow W... | oracle_rightnow_we... | oracle rightnow w... |
| ☒ | N | N | N,UNK,N,V | 4-ngram | Oracle RightNow W... | oracle_rightnow_we... | oracle rightnow w... |
| ☒ | N | N | DET,N | 2-ngram | the Oracle | the_oracle | the oracle |
| ☒ | N | N | CONJS,DET,N | 3-ngram | and the Oracle | and_the_oracle | and the oracle |
| ☒ | N | N | DET,N,UNK | 3-ngram | the Oracle RightNow | the_oracle_rightnow | the oracle rightnow |
| ☒ | N | N | PUNCT,CONJS,... | 4-ngram | , and the Oracle | ,_and_the_oracle | , and the oracle |
| ☒ | N | N | CONJS,DET,N,U... | 4-ngram | and the Oracle Rig... | and_the_oracle_rig... | and the oracle rig... |
| ☒ | N | N | DET,N,UNK,N | 4-ngram | the Oracle RightNo... | the_oracle_rightno... | the oracle rightno... |
| ☒ | N | N | N,PUNCT,CONJ... | 5-ngram | expectation, and t... | expectation_and_t... | expectation, and t... |
| ☒ | N | N | PUNCT,CONJS,... | 5-ngram | , and the Oracle Rig... | ,_and_the_oracle_rig... | , and the oracle ri... |
| ☒ | N | N | CONJS,DET,N,U... | 5-ngram | and the Oracle Rig... | and_the_oracle_rig... | and the oracle rig... |
| ☒ | N | N | DET,N,UNK,N,N | 5-ngram | the Oracle RightNo... | the_oracle_rightno... | the oracle rightno... |
| ☒ | N | N | DET,N,UNK,N,V | 5-ngram | the Oracle RightNo... | the_oracle_rightno... | the oracle rightno... |
| ☒ | N | N | N,UNK,N,N,V | 5-ngram | Oracle RightNow W... | oracle_rightnow_we... | oracle rightnow w... |
| ☒ | N | N | N,UNK,N,V,V | 5-ngram | Oracle RightNow W... | oracle_rightnow_we... | oracle rightnow w... |
| ☒ | N | N | DET,N,PUNCT,... | 6-ngram | an expectation, and... | a_expectation_and... | a expectation, and... |
| ☒ | N | N | N,PUNCT,CONJ... | 6-ngram | expectation, and the... | expectation_and_t... | expectation, and... |
| ☒ | N | N | PUNCT,CONJS,... | 6-ngram | , and the Oracle Rig... | ,_and_the_oracle_rig... | , and the oracle rig... |
| ☒ | N | N | CONJS,DET,N,U... | 6-ngram | and the Oracle Righ... | and_the_oracle_rig... | and the oracle righ... |
| ☒ | N | N | CONJS,DET,N,U... | 6-ngram | and the Oracle Righ... | and_the_oracle_rig... | and the oracle righ... |
| ☒ | N | N | DET,N,UNK,N,N,V | 6-ngram | the Oracle RightNo... | the_oracle_rightno... | the oracle rightno... |
| ☒ | N | N | DET,N,UNK,N,V,V | 6-ngram | the Oracle RightNo... | the_oracle_rightno... | the oracle rightno... |
| ☒ | N | N | N,UNK,N,N,V,DET | 6-ngram | Oracle RightNow W... | oracle_rightnow_we... | oracle rightnow w... |
| ☒ | N | N | N,UNK,N,V,V,DET | 6-ngram | Oracle RightNow W... | oracle_rightnow_we... | oracle rightnow w... |
| ☒ | N | N | PUNCT,N | 2-ngram | : Oracle | oracle | : oracle |
| ☒ | N | N | N,PUNCT,N | 3-ngram | Sheet : Oracle | sheet_oracle | sheet : oracle |

FIG. 7

| | | |
|---|---|---|
| Details | | |
| Minimal frequency | 0 | ←802 |
| Original text pattern | Oracle.*Service | ←804 |
| OLT Stem pattern | .* | ←806 |
| Lemma pattern | .* | ←808 |

Languages
☐ Select All ☑ AMERICAN ←810

(Root) PoS
☐ Select All ☑ N ←812

MWU Part PoS (deselect to exclude)
☐ Select all ☑ N ☐ PROPN ☐ V ☐ ADJ ☐ ADV ☐ PREP ☐ PRO ☐ DET
☐ CARD ☐ CONJS ☐ WH ☐ PUNCT ☐ PRE ☐ ACR ☑ UNK ←814

MWY PoSs
☑ Deselect all ☑ N N ☑ N N N ☑ N N N N ☑ N N N N N ☑ N UNK ☑ N UNK N
☑ N UNK N N ☑ N UNK N N N ☑ N UNK N N N N ☑ N UNK UNK ☑ N UNK UNK N
☑ N UNK UNK N N ☑ UNK N ☑ UNK N N ☑ UNK N N N ☑ UNK N N N N
☑ UNK N N N N N ☑ UNK UNK ☑ UNK UNK N ☑ UNK UNK N N ←816

MWU Count
☐ Select All ☑ 2-ngram ☑ 3-ngram ☑ 4-ngram ☑ 5-ngram ☑ 6-ngram ←818

[ Ok ] [ Revert ] [ Cancel ]

AMERICAN

| Sel | PoS | MWU PoSs | Type | Original Text | Lemma |
|---|---|---|---|---|---|
| ☐ | N | N,UNK,UNK,N,N | 5-ngram | Oracle RighNow CX Cloud Service | oracle_rightnow_cx_cloud_service |
| ☒ | N | N,UNK,N,N,N,N | 6-ngram | Oracle RighNow Intent Guide Cloud Service | oracle_rightnow_intent_guide_cloud_service |
| ☐ | N | N,UNK,N,N,N | 5-ngram | Oracle RighNow Web Self Service | oracle_rightnow_web_self_service |
| ☒ | N | N,UNK,N,N,N | 5-ngram | Oracle RighNow Mobile Cloud Service | oracle_rightnow_mobile_cloud_service |
| ☒ | N | N,UNK,N,N,N | 5-ngram | Oracle RighNow Chat Cloud Service | oracle_rightnow_chat_cloud_service |
| ☒ | N | N,UNK,N,N,N,N | 6-ngram | Oracle RighNow Email Management Cloud... | oracle_rightnow_email_managagment_clo... |

Select/Deselect All | Add | Insert | Delete | Purge | Filter

FIG. 9

AUTOMATIC ONTOLOGY GENERATION FOR NATURAL-LANGUAGE PROCESSING APPLICATIONS

CROSS-REFERENCES TO RELATED APPLICATIONS

This application claims the benefit of U.S. Provisional Application No. 62/077,868 filed on Nov. 10, 2014 entitled "Automatic Batch Generation of Concept Relations from N-Grams from Linguistic Input Data." This application also claims the benefit of U.S. Provisional Application No. 62/077,887 filed on Nov. 10, 2014 entitled "Lemma Mapping to Univerasal Ontologies." Each of these applications is hereby incorporated herein by reference for all purposes.

The following three applications are related to each other and are filed on the same date of Jul. 6, 2015: U.S. Ser. No. 14/793,677 filed on Jul. 7, 2015 entitled "Automatic Generation of N-Grams and Concept Relations From Linguistic Input Data" to Fabrice Nauze et al.; U.S. Ser. No. 14/793,701 filed on Jul. 7, 2015 entitled "Automatic Ontology Generation for Natural-Language Processing Applications" to Margaret Salome et al.; and U.S. Ser. No. 14/793,658 filed on Jul. 7, 2015 entitled "Lemma Mapping to Universal Ontologies in Computer Natural-Language Processing" to Fabrice Nauze et al. Each of these applications are hereby incorporated by reference.

BACKGROUND

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and Enterprise forms automation.

BRIEF SUMMARY

In some embodiments, a method of generating ontologies for a Virtual Assistant across different languages may include extracting a plurality of tokens in a first language from a plurality of web resources in a web domain that includes the Virtual Assistant, where the web resources are made available in a first language and a second language. The method may also include determining a first part-of-speech (POS) for each of the plurality of tokens, where the first POS is specific to the first language. The method may additionally include mapping, for each of the plurality of tokens, the first POS to a second POS from a standardized set of POS's that are general across the first language and the second language. The method may further include generating a plurality of lemmas from the plurality of tokens. The method may also include causing a network of nodes to be displayed, where each node in the network of nodes represents one of the plurality of lemmas, and connections between the nodes in the network of nodes represents conceptual relationships between the plurality of lemmas.

In some embodiments, a non-transitory, computer-readable medium may include instructions which, when executed by one or more processors, causes the one or more processors to perform operations including extracting a plurality of tokens in a first language from a plurality of web resources in a web domain that includes a Virtual Assistant, where the web resources are made available in a first language and a second language. The operations may also include determining a first part-of-speech (POS) for each of the plurality of tokens, where the first POS is specific to the first language. The operations may additionally include mapping, for each of the plurality of tokens, the first POS to a second POS from a standardized set of POS's that are general across the first language and the second language. The operations may further include generating a plurality of lemmas from the plurality of tokens. The operations may also include causing a network of nodes to be displayed, where each node in the network of nodes represents one of the plurality of lemmas, and connections between the nodes in the network of nodes represents conceptual relationships between the plurality of lemmas.

In some embodiments, a system may include one or more processors and one or more memory devices including instructions that, when executed by the one or more processors, cause the one or more processors to perform operations including extracting a plurality of tokens in a first language from a plurality of web resources in a web domain that includes a Virtual Assistant, where the web resources are made available in a first language and a second language. The operations may also include determining a first part-of-speech (POS) for each of the plurality of tokens, where the first POS is specific to the first language. The operations may additionally include mapping, for each of the plurality of tokens, the first POS to a second POS from a standardized set of POS's that are general across the first language and the second language. The operations may further include generating a plurality of lemmas from the plurality of tokens. The operations may also include causing a network of nodes to be displayed, where each node in the network of nodes represents one of the plurality of lemmas, and connections between the nodes in the network of nodes represents conceptual relationships between the plurality of lemmas.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 6 illustrates a user interface for displaying the information in the token data structures returned by the language analysis tool.

FIG. 7 illustrates a user interface representing N-gram lemmas of various lengths, according to some embodiments.

FIG. 8 illustrates an interface for designing lemma filters, according to some embodiments.

FIG. 9 illustrates a user interface for generating a final list of lemmas for the ontology, according to some embodiments.

DETAILED DESCRIPTION

Figure 1:
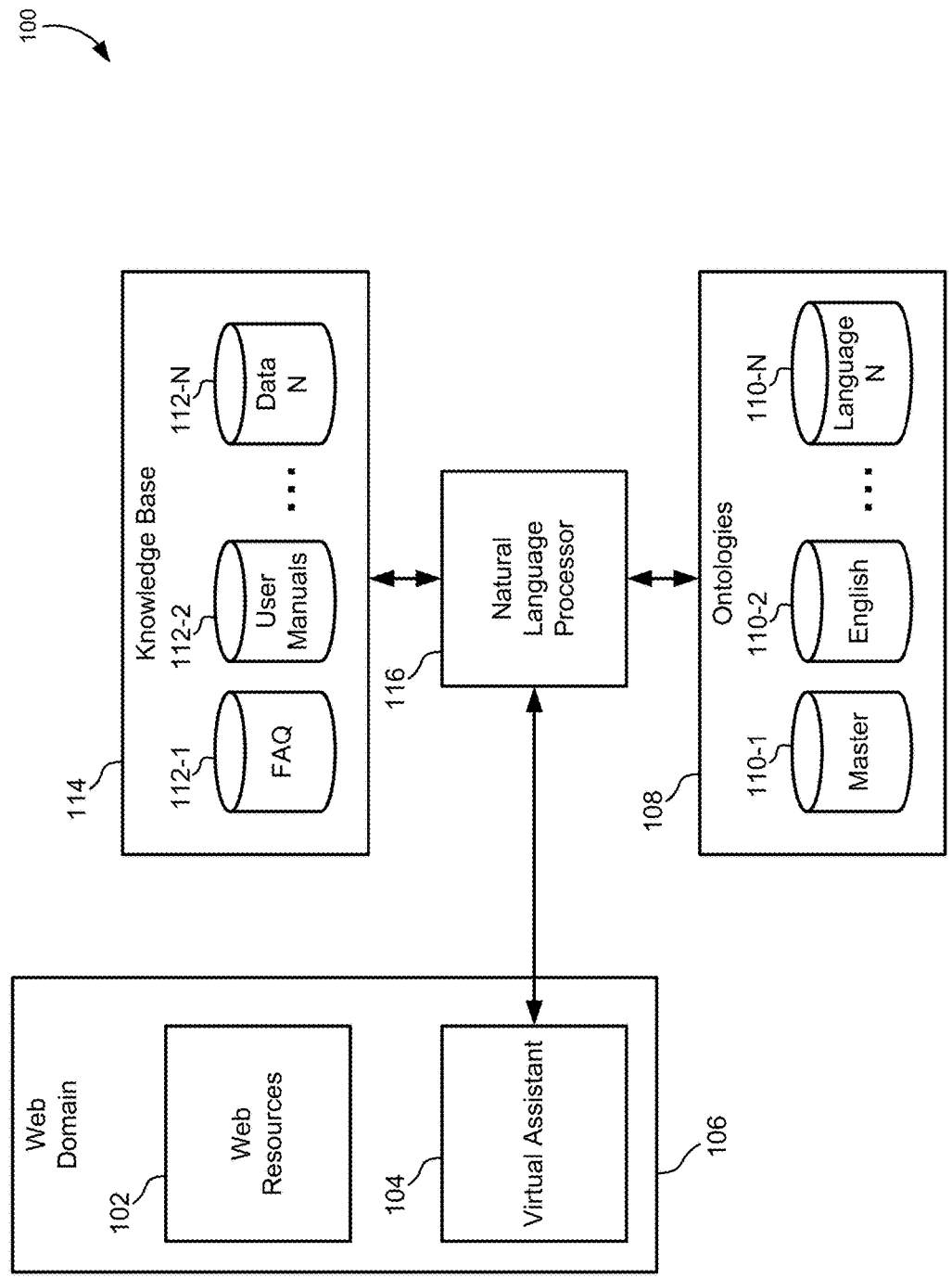
FIG. 1 illustrates a simplified block diagram of a web-based Virtual Assistant, according to some embodiments.

Described herein, are embodiments for generating and providing natural language ontologies for a Virtual Assistant and other natural language processing applications. The Virtual Assistant will generally be linked to a corpus of text, such as webpages, databases, FAQ documents, and so forth. These embodiments can scrape the corpus of text to identify tokens, or words, that are candidate lemmas for an ontology. A tool can be used to identify a part-of-speech (POS) for each token, along with a root (or stem) of the token as used in the particular language of the corpus of text. In order to standardize ontology generation across different web resources and across different languages, the POS for each token can be mapped to a standardized POS mapping that can be used across languages. Combinations of tokens can then be filtered and refined in order to generate a library of lemmas (or concepts) that can be used to generate the basis of the ontology. Finally, a visualization tool can be provided to establish, edit, and understand relationships between lemmas in the ontology hierarchy. Applications, such as a Virtual Assistant, can then use the ontology to group concepts in a knowledge base and map user queries to intent categories. In other embodiments, the relationships between concepts in the generated ontology can used in search engines that answer user questions automatically and respond to user questions.

Prior to this disclosure, there were two common sources of ontologies for use in such systems. First, an open source or publicly available and comprehensive ontology can be used, such as the ontology available from WordNet™. These public ontologies are very comprehensive, in some cases defining concepts and relationships for the entirety of a human language. However, the comprehensive nature of such ontologies may be be detrimental when analyzing a certain limited domain. For example, a web domain for an airline may have a limited corpus of information that would be relevant to a user query. Using public ontologies may introduce concepts that have no meaning in such a specialized domain. Simply put, public ontologies are too exhaustive and provide search engines with too many hits, thereby increasing recall over precision. Additionally, a web domain may include custom terminology and definitions that would not be understood or appropriate in a public ontology.

Second, a custom ontology can be created by hand. In the example above of the web domain, web designers could painstakingly categorize all of the information introduced by the web domain and generate an ontology. This has the advantage of limiting the ontological concepts to those specific to the web domain. However, this manual operation is both error-prone and nearly impossible to maintain through the lifecycle of a web domain. As the web domain changes and terminology is introduced and/or deprecated, the hand-built ontology will quickly grow out of date. Each time the web domain is updated, the ontology would have to be updated as well. This process is simply not sustainable for large web domains.

A third option is introduced by the embodiments described herein. These embodiments operate such that a web domain can be automatically analyzed by computer tools and an ontology of concepts and relationships can be automatically generated. This operation can be repeated throughout the lifecycle of the web domain. These tools can facilitate varying levels of human interaction such that each step of the ontology-generation process can be verified. The automatic methods that existed prior to this disclosure rely on statistical methods that are dependent on a large amount of data as well as data annotations for training the statistical model. While this may work well in the case of large generic ontologies, it does not apply well to domains were data is relatively scarce and/or specialized. Most business-specific and customer-specific domains have a relatively small corpus of information for the statistical methods to ingest, often small enough that statistical methods cannot build a reliable model leading to their failure.

In some embodiments, a standardized set of libraries and procedures can be used to generate ontologies from virtually any corpus of text. When scraping a corpus, the tool can include routines tailored for specific document types (e.g., HTML, PDF, XML, etc.). These routines can identify information and words in the documents that can be eliminated from the list of tokens. This information may include metadata, structural data, formatting data, stylesheet information, and so forth. The list of tokens can then be combined to generate N-grams of various lengths. A set of customizable filters can be used to automatically refine the list of N-grams down to a final list of candidate N-grams to be used in the ontology.

For exemplary purposes, this disclosure will use a Virtual Assistant operating in a particular web domain as an example application for the ontology generation process described above. It will be understood, however, that this ontology generation process may be used with virtually any corpus of text and applied to any application that involves natural language processing. Specifically, the corpus of text in these examples will include a set of web resources provided by a web domain linked to the Virtual Assistant. However, in other applications, the corpus of text could include any text resource.

FIG. 1 illustrates a simplified block diagram 100 of a web-based Virtual Assitant 104, according to some embodiments. A web domain 106 may provide goods and services to customers engaging in transactions over the Internet. While interacting with the web domain 106, customers may interact with various web resources 102, including but not limited to HTML webpages, CSS stylesheets, backend databases, XML files, PDF documents, blog postings, Internet forums, and so forth. During the course of these interactions, users may require assistance in completing transactions or finding information that they need. Instead of providing a human interaction for each such instance, the web domain 106 may instead provide a Virtual Assistant 104 configured to interpret user questions and provide answers from a knowledge base 114. A knowledge base may include FAQs, user manuals, white papers, multimedia content, and a catalog of the web resources 102 available to users of the web domain 106 that may be helpful in answering questions. In some embodiments, the Virtual Assistant 104 may include a speech product configured such that users can type their questions into a dialog box and receive a spoken answer back regarding their query. For example, a user could input "I want to buy a new smart phone, can you help me purchase model 9.2?" The Virtual Assistant 104 could then engage in a guided discussion back and forth with the user, ultimately providing an answer in the form of an entry in the knowledge base 114.

In order for the Virtual Assistant 104 to respond in a precise and relevant way, drawing on different contextual cues provided by the user, a robust representation of language concepts and relationships is required. A dictionary of concepts that is organized into a hierarchy will be referred to herein as an "ontology." These ontologies may also be referred to as grammars and/or thesauri. In responding to a user query, a natural language processor 116 can parse the user query and identify one or more intent categories expressed by the query. Information in the knowledge base 114 can span across different domains 112 (e.g. data sources) while being categorized across these different domains 112 according to the intent categories. Intent categories may include topics such as "upgrading your cell phone," or "I can't access my email" that may be commonly received from customers. These intent categories may be linked with concepts expressed in an ontology 108 generated from the web resources 102. In one sense, the embodiments described herein analyze the web resources 102 and generate a hierarchy of terminology and concepts that may be unique to the particular web domain 106. The concepts in this ontology 108 can be used by the natural language processor 116 to more accurately identify the intent of a query received through the Virtual Assistant 104. For example, a query may use terminology that would have many different meanings across different web domains, but which has a specific meaning within the particular web domain 106. The particular web domain 106 may also use specialized terminology that would not be widely used in other domains. Instead of using a general ontology for a language (e.g. English) as a whole, these embodiments generate an ontology 108 that is specific to the web domain 106. This streamlined and robust ontology 108 that is specific to the web domain 106 will generally provide more accurate results with faster processing time that using a general ontology for particular language.

In many applications, web domain 106 will be provided to customers in many different languages. For example, a company may provide a website in English, Chinese, and Japanese in order to accommodate a worldwide customer base. The web resources 102 may be translated into these various languages and provided based on the location of the user. Prior to this disclosure, individual ontologies for each language version of the web resources 102 would need to be generated. This process was largely manual and required language experts for each specific language. In the embodiments described herein, web resources can be scraped in each language by the ontology generation tool, and each token can be matched to a standardized POS mapping for concepts that are consistent across languages. Because a concepts hierarchy generally will not change between languages, is possible to generate multiple versions of the ontology 108 (e.g., ontology version s 110-2, . . . 110-N) using a master ontology 110-1 by mapping concepts expressed in each language to concepts in the master ontology 110-1, and then preserving the concept relationships from the master ontology 110-1. The visualization tool described later in this disclosure can be used to view ontology relationships across various languages.

Figure 2:
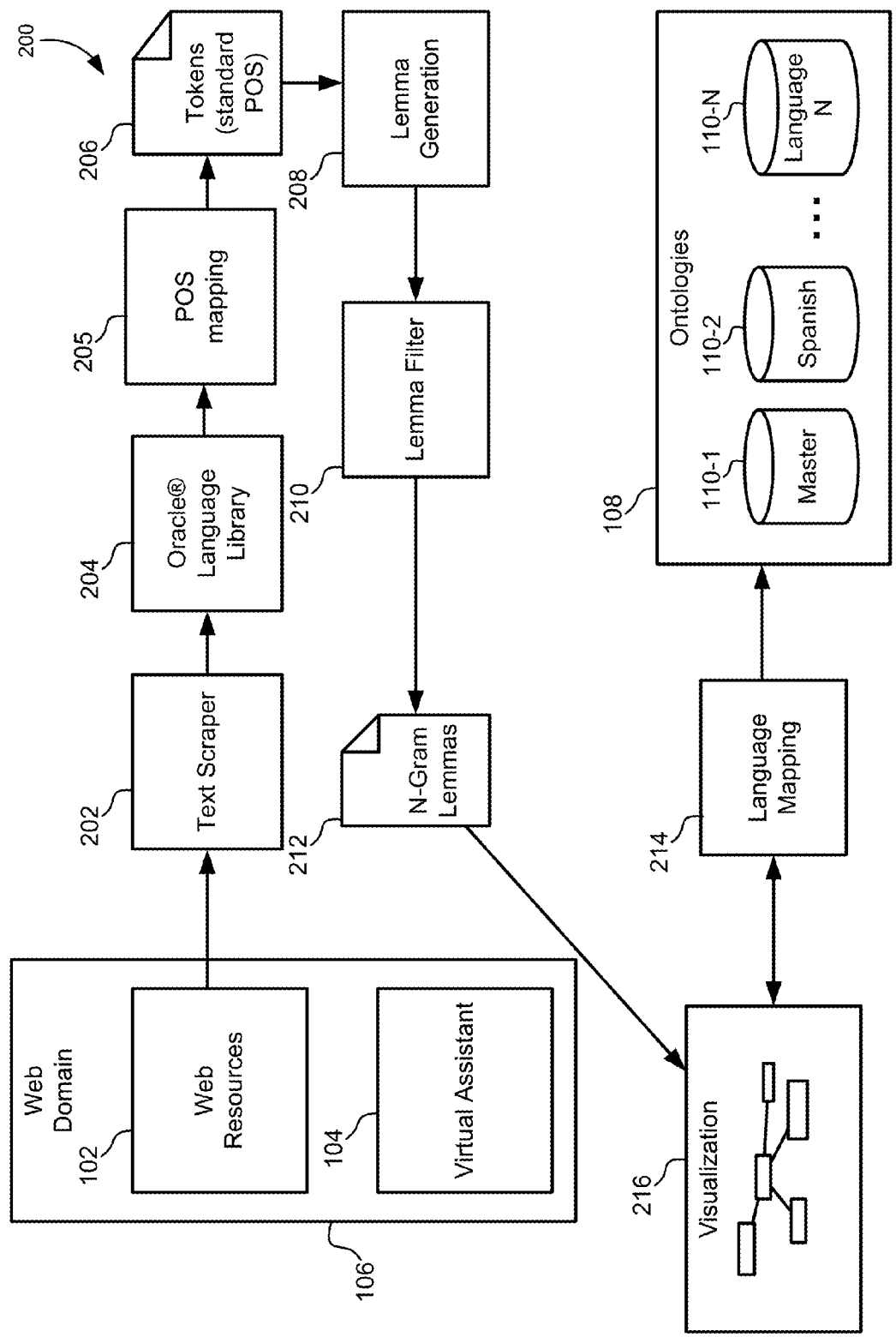
FIG. 2 illustrates a block diagram of a system for generating natural language ontologies, according to some embodiments.

FIG. 2 illustrates a block diagram 200 of a system for generating natural language ontologies, according to some embodiments. In order to provide the ontology 108 from FIG. 1 for use with an application such as a Virtual Assistant, some embodiments will use a standardized tool for generating, editing, and refining an ontology from a set of web resources 102. FIG. 2 provides a general overview of the ontology generation process. Afterwards, this disclosure will walk through each step of this process in greater detail. To begin, a text scraper 202 can crawl the web resources 102 and extract tokens, or words from the web resources 102. These words can then be filtered by the text scraper 202 to remove information that clearly should not be included in the ontology 108, such as formatting and structural information. These words or tokens can then be sent to a language analysis tool 204, such as the Oracle® language library. The language analysis tool 204 can accept the relevant text from the text scraper 202 and identify, for each token, a root form of the token and a POS. For example, if "features" was one of the words scraped from the web resources 102, the language analysis tool 204 would return a data structure that includes the original text ("features"), the stem or root of the word ("feature"), a POS (noun), and a rich collection of other language-specific information about that particular token. The POS can be inferred by the language analysis tool 204 by the context in which the token is used in the web resources 102.

The language analysis tool 204 will return tokens and POS indications that are specific to the particular language of the web resources 102. In order to standardize the ontology generation process and to alleviate the need for language-specific experts in generating language-specific ontologies, a POS mapping process 205 can use a table of standard POS mappings that apply to virtually all languages. An example of such a standardized POS file is illustrated below in Table 1. Speech conventions vary widely across languages and domains. Prior to this disclosure, generating ontologies in different languages required different processes to handle different usage conventions. Table 1 standardizes the POS analysis by standardizing a set of base usage concepts that can be applied across languages. The POS mapping process 205 can use a standardized POS in conjunction with language-specific mapping files that map parts of speech in each particular language to the standardized POS file. For example, a particular word in Spanish may map to the corresponding superlative adjective category in Table 1 of the standardized file. A Spanish-to-standard mapping file can list relationships between the POS conventions in Spanish and the POS conventions listed in Table 1. The POS mapping process 205 can apply these relationships in the Spanish-to-standard mapping file to translate each POS in Spanish to a POS in the standard of Table 1. It should be noted that some languages will have parts-of-speech that are not consistent across languages, such as the Japanese politeness particles that are not present in English.

It should also be noted that Table 1 illustrates a subset of a standardized POS taxonomy that includes common POS's. Additional POS definitions and conventions can be added to Table 1 in each embodiment. These can be accommodated using extra labels to cover the specifics of the Japanese language, for instance. By associating each token with a standard POS, the tokens are no longer merely words, but instead represent concepts—concepts that can be consistently represented across languages. For instance, the "bow" (noun) of a boat is very different from the action "to bow" (verb), and these two concepts can be separated by their respective POS. While these two concepts are represented by the same word in English, they will be represented by different words in Spanish (i.e., "proa" and "inclinar"). Standardizing the POS analysis can be instrumental in mapping ontology concepts between languages to simplify the process of ontology generation. The output of the POS mapping process will be a collection of data structures representing tokens 206 using the standardized POS mapping.

TABLE 1

Standardized Set of Parts-of-Speech

| Base Tags | Second Tags | Description | Examples |
| --- | --- | --- | --- |
| ADJ | CMP | adjective degree: comparative | happier |
|  | SUP | adjective degree: superlative | best |
|  | MULT | multiword units | cum laude |
|  | POST | post-modifier | deep |
|  | PRE | pre-modifier | yearly |
|  | LOC | locational adjectives | Californian |
|  | TIME | temporal adjectives | current |
| ADV | INTENS | intensifiers | extremely |
|  | CMP | adverb degree: comparative | better |
|  | MULT | multiword units | all the way |
|  | REL | relative adverbs | which, where, whom |
|  | NEG | negation | not |
|  | IGN | content ignored | confidentially, correctly, fully, incorrectly |
| CONJ | FOR_N | for nouns | and, and or, as well as, nor, or, or rather |
|  | FOR_S | for sentences | although, unless, whenever, whereas, wherever, while |
| NOUN | EVENT | event | Halloween |
|  | MONTH | month | May |
|  | TIMEUNIT | time Unit | hours, months, etc. |
|  | SITE | website | booking com |
|  | GEOGR | geography | country |
|  | LOC | location | Italy, Milan |
|  | TITLE | title | Dr, Lord, Miss, Mr, Mrs, Prof etc. |
|  | WHY | reason literals | reason, reasons |
| NUMBER | ORDINAL | suffix based | nd, rd, st, th |
|  | PERCENT | percentage | number and %, regexp |
|  | YEAR | year | 2005, regexp |
| PREP | LOC | locational phrases | adjacent to, around, at, away, while in, within, to from |
|  | TIME | temporal expressions | till, after, at, at the same time as, before, by, during, in, in advance |
|  | TO | goal | in order to, to |
|  | ABOUT | about literals | about, on |
| PRONOUN | SOMETHING | unspecified object | any time, anything, anything else, anytime, something |
|  | OTHER | other literals | other, others |
|  | SOMEBODY | unspecified person | anybody, anyone, everybody, everyone, one, somebody |
|  | REFL | reflexive | her, herself, him, himself, it, itself, me, myself, ourselves |

TABLE 1-continued

Standardized Set of Parts-of-Speech

| Base Tags | Second Tags | Description | Examples |
| --- | --- | --- | --- |
|  | REL | relative | in which, that, which, who, whom |

The tokens 206 can then be fed into a lemma generation engine 208 and undergo a lemma filtering process 210 to generate a final list of N-gram lemmas 212 for the ontology 108. This process will be described in greater detail later in this disclosure. Generally, lemmas can be built from one, two, three, or more consecutive tokens as they appear in the web resources 102. For example, the tokens "flight" and "deck" appearing consecutively can be combined to form the lemma "flight deck" representing the concept of a flight deck, which is distinct from the concepts of both "flight" and "deck" individually. Additionally, additional lemmas might be formed from these tokens, such as "primary flight deck" and "secondary flight deck." Various filters can be used to prune the set of candidate N-grams down to the final list of N-gram lemmas 212.

After a final list of N-gram lemmas 212 is generated, relationships can be established between the N-gram lemmas to form the final ontology hierarchy. In order to generate relationships, a visualization tool 216 can be used to graphically lay out nodes and connections in the hierarchy. An example of a visualization tool 216 will be provided later in this disclosure. The visualization tool 216 can provide users with a level of understanding and an overall sense of how relationships between lemmas affect each other that was previously unavailable. In some embodiments, the visualization tool 216 can present a workspace with a two-dimensional graph of nodes representing lemmas. The user can then graphically connect lemmas together in a hierarchical fashion in order to generate the final relationships for the ontology 108.

In some embodiments, a master ontology 110-1 can be generated in a selected language, such as English. The master ontology 110-1 can have relationships established manually by a user familiar with the web domain 102 and the particular language (e.g. English). The master ontology 110-1 uses lemmas and POS conventions that are standardized across languages, meaning that the concepts represented by one of the N-gram lemmas 212 in the language of the master ontology 110-1 can be mapped to a corresponding concept represented by a different N-gram lemma in another language (e.g. Spanish). In order to generate ontologies in other languages, the version of the web resources 102 in the other language only needs to run through a portion of the process of FIG. 2. For example, a Spanish website can have its text scraped (202), have its tokens given a Spanish-specific POS by the language analysis tool 204, have the tokens' POS mapped to the standard POS of Table 1 (205), and have N-gram lemmas generated for the Spanish language (208, 210). Instead of requiring a user to manually establish relationships between the Spanish N-gram lemmas in a hierarchical fashion, a language mapping process 214 can match the concepts in the master ontology 110-1 with the concepts represented by the Spanish N-gram lemmas. Once all the Spanish N-gram lemmas are matched, the relationships established in the master ontology 110-1 can be mapped between the Spanish N-gram lemmas to generate a Spanish ontology 110-2 without requiring a Spanish-language-specific expert to establish relationships between the Spanish N-gram lemmas. By standardizing both the POS conventions and the process for generating ontologies across languages, this process can largely be automated and the potential for errors and mismatches between language ontologies can be virtually eliminated.

Figure 3:
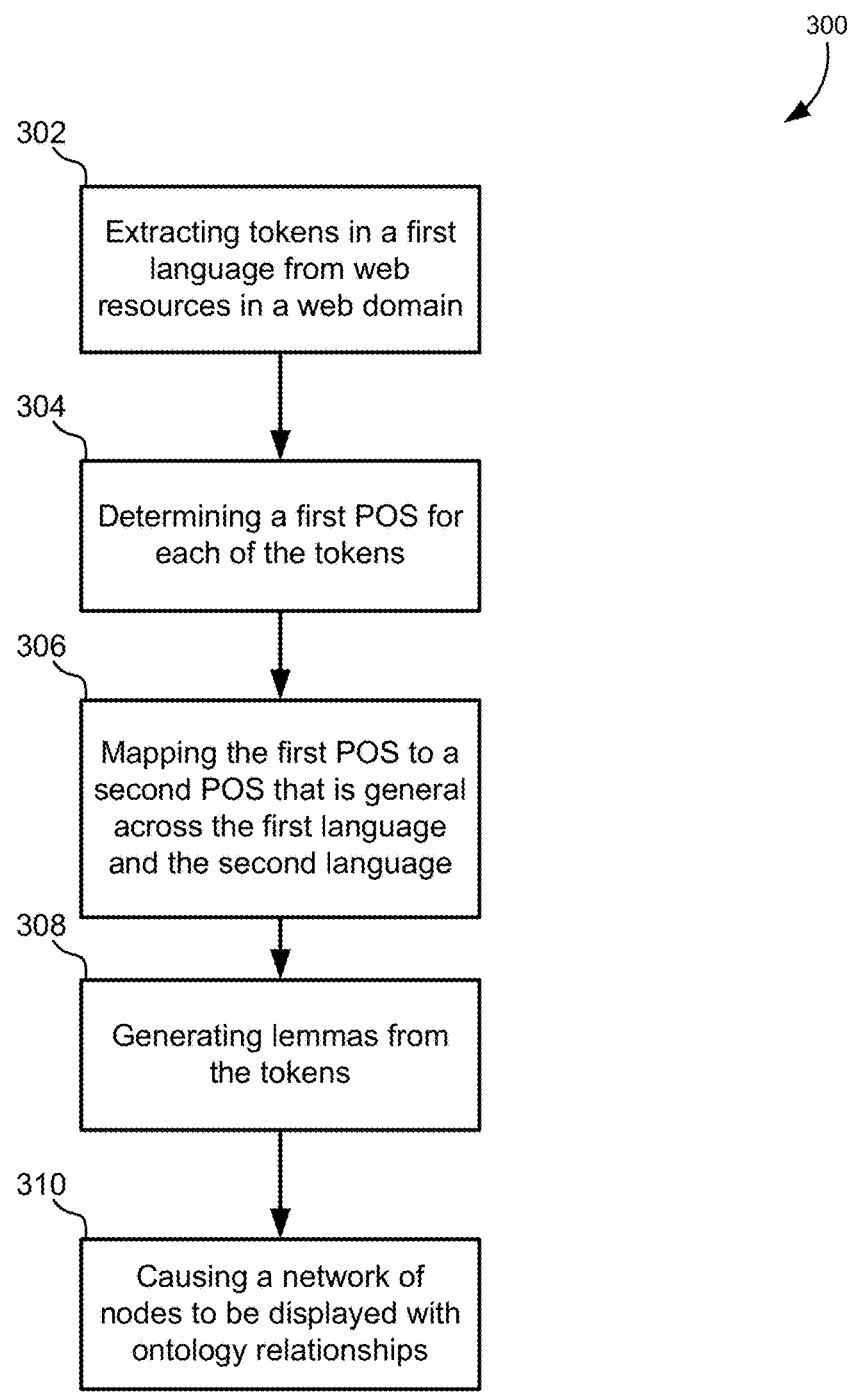
FIG. 3 illustrates a flowchart of a method for generating ontologies in different languages using standardized processes, according to some embodiments.

FIG. 3 illustrates a flowchart 300 of a method for generating ontologies in different languages using standardized processes, according to some embodiments. The method may include extracting tokens in a first language from web resources and a web domain (302). The web domain may present different versions of webpages in different languages (e.g. a first language, a second language, etc.). For example, a web domain for a multinational business entity may have virtually identical webpages in English, Chinese, Japanese, French, and Spanish. The web domain may include a Virtual Assistant application that uses the ontology in order to service user queries. The tokens can be extracted from many different types of web resources and the web domain. In some cases, the web domain may include different document formats, such as HTML, PDF, XML, CCS, DOC, and so forth. In order to extract tokens from different document types, the tool may include scripts that are specific to each document type that can be executed individually. For example, one script can scrape text from an HTML page in such a way that only meaningful text is tokenized. JavaScript, HTML tags, formatting information, and so forth, can be eliminated by the HTML-tokenizing script and the meaningful text displayed on the webpage can be tokenized. Generally, "tokens" will refer to individual words or symbols in the text. For example, the phrase "open 24/7" would include tokens such as "open", "24", "/", and "7".

The method may also include determining a first POS for each of the tokens (304). The first POS can be specific to the language of the web domain from which the tokens were extracted. For example, for an English web domain, the first POS would include English-specific POS's. In some embodiments, the extracted text can be provided to a language analysis tool that provides an output where each token is assigned its own individual, language-specific POS. In some embodiments, existing language analysis tools can be leveraged, such that this invention does not require the development of a new language analysis tool for each language to identify and assign a POS. Instead, these embodiments allow existing language analysis tools operate without modification, and then standardize the POS assignments.

The method may additionally include mapping the first POS to a second POS for each token (306). In order to deal with the various POS assignments for any language, a standardized POS taxonomy has been developed that is applicable across many languages. As described above, a language-specific mapping file can translate language specific POS assignments to the standardized POS. Note that the language of the first POS and the language of the second POS may be the same. For example, the language analysis tool may output a set of POS assignments that are English-specific, but that do not conform to the naming conventions and categories of the standardized POS, even though the standardized POS may also be in English.

The method may further include generating lemmas from the tokens (308). As will be described further below, the lemmas can be generated by creating N-grams from the tokens and filtering the N-grams through a series of pre-defined filter conditions. At this point, the lemmas will represent the concepts that will populate the ontology being generated. The method may additionally include causing a network of nodes to be displayed with ontology relationships (310). An example of the visualization tool will be provided in greater detail later in this disclosure. Generally, the visualization tool may provide a graphical display of an ontological hierarchy. The nodes in the hierarchy will represent the lemmas, and connections between the nodes will represent the conceptual relationships between the lemmas. For example, a connection between a lemma representing a "vehicle" and a "automobile" would represent an "is-a" relationship between the "vehicle" and the "automobile." In some embodiments, the visualization tool will allow users to change the position of nodes and edit the connections between the nodes to formulate the hierarchy of the ontology. The visualization tool offers the advantage of allowing the user to see how connections will affect nearby concepts as changes are made.

In order to fully understand the method of flowchart 300, a series of algorithms and flowcharts will now be presented that show each step of the process described above in greater detail. In some embodiments, a tool and workflow can be automated to create a high-precision ontology that incorporates the benefit of custom-and-built ontologies while minimizing the level of human interaction and the work needed to keep the web domain and the ontology congruent. The tool can receive human inputs from a user (or "content curator") to focus on text data that is specific to a selected domain. The first step in the process is to receive a selection of a "corpus", or collection of written texts that embody a particular subject matter. In some embodiments, the corpus can be selected by a user, or can be automatically selected based on a web domain. For example, a user can enter a web domain, and the process can select all of the webpages in the web domain as the corpus. The corpus can be any text-based document, such as a database, a web domain, an FAQ, a manual, and/or the like. For example, a user could wish to generate an ontology for a customer's cloud-based products. The customer could select the web domain for the particular customer and use the webpages as the corpus for the process. If webpages have been selected, then the process can "scrape" the webpages to extract usable text from the webpages. This may include isolating text that is displayed on the webpage from other nonvisible text in the HTML file that merely defines the organization of the webpage and/or metadata.

Figure 4:
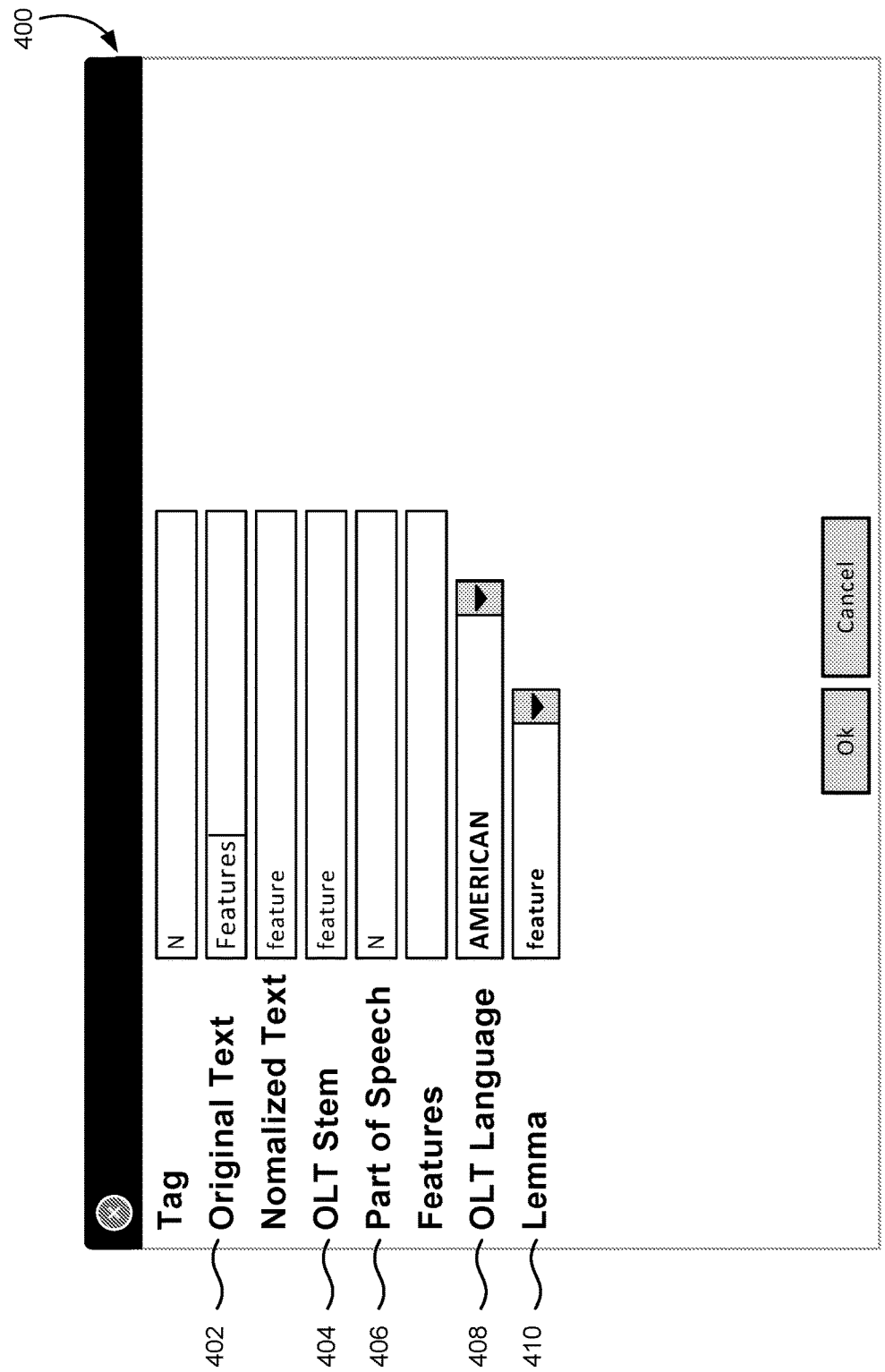
FIG. 4 illustrates a user interface for interacting with a language analysis tool, according to some embodiments.

It should be appreciated that the specific steps illustrated in FIG. 4 provide particular methods of generating ontologies according to various embodiments of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 4 illustrates a user interface 400 for interacting with a language analysis tool, according to some embodiments. An original text 402 box can allow a user to enter a token of actual text from the web resources. Alternatively or additionally, the original text 402 can be auto populated by scraping the token from the web resources. Generally, user interface 400 illustrates the type of analysis that can be performed for each token that is scraped from a web resource. The original text 402 can be sent as an input to the language analysis tool. As an output, the language analysis tool can populate the other text boxes in user interface 400.

For example, the language analysis tool can return a stem, or root, of the original text in the stem 404 text box. The language analysis tool can also provide a part of speech 406. Additionally, the user can select a language 408, or the language analysis tool can automatically detect the language and populate the language 408 text box (e.g., American English). Finally, one or more lemmas 410 can be derived from the original text and used to populate a control in user interface 400. The one or more lemmas can represent N-grams of length 1 that can be used to form other lemmas that are comprised of N-grams of lengths greater than 1. The information represented visually by user interface 400 can be stored by a rich data structure for each token scraped from the web resources.

Figure 5:
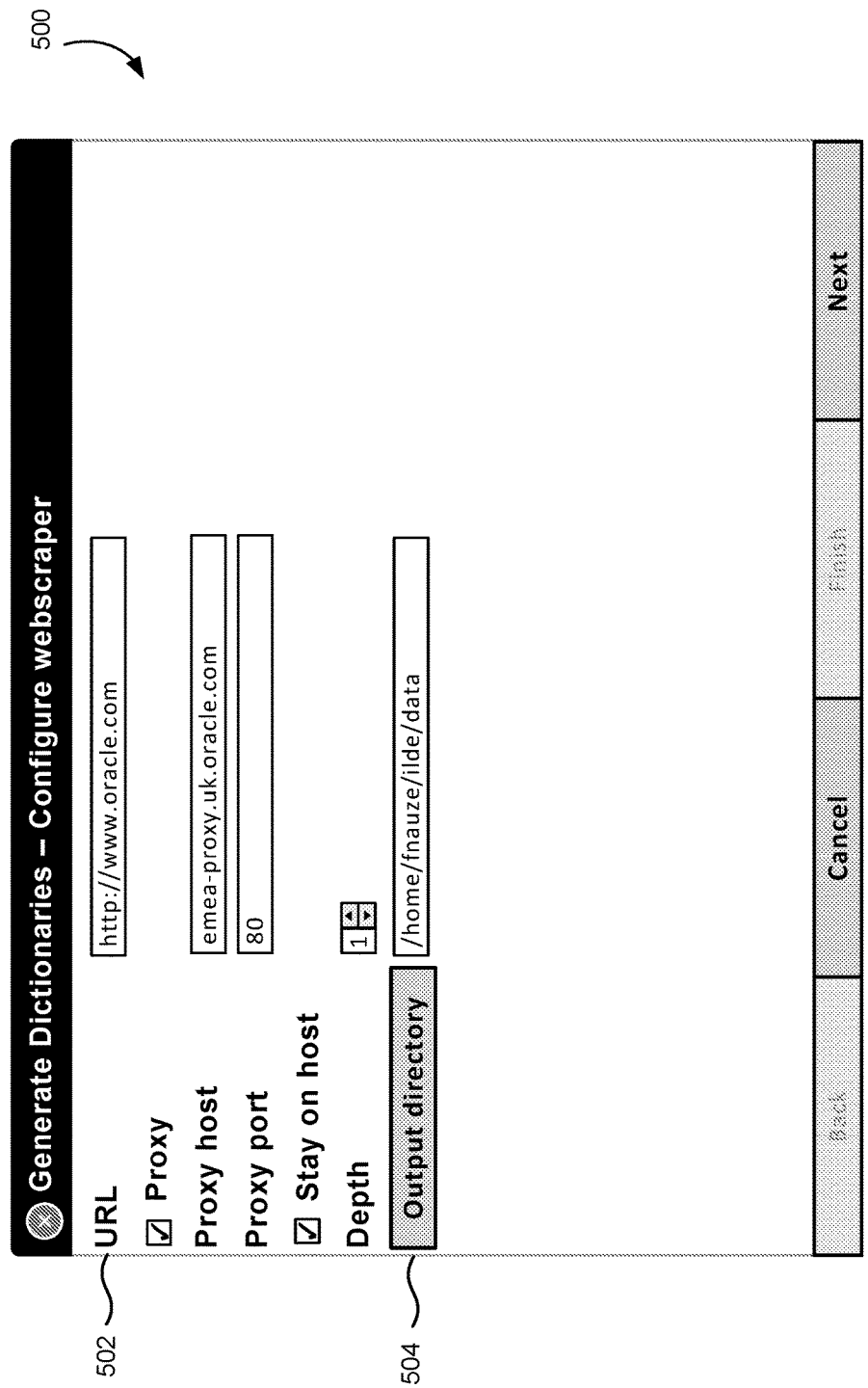
FIG. 5 illustrates a user interface for automatically extracting tokens from a web domain, according to some embodiments.

FIG. 5 illustrates a user interface 500 for automatically extracting tokens from a web domain, according to some embodiments. Information identifying the web domain, such as a URL 502 and/or a proxy indication/hostname can also be specified. After receiving this information, the tool can automatically crawl webpages within the web domain identified by the URL 502 and extract all the web resources available, such as webpages, media content, text documents, PDFs, and so forth. Each type of document found in the web domain or referenced by webpages in the web domain can be automatically identified by its file type extension. After this identification, the tool can select a particular script file that matches the file extension for each document and execute each script to scrape relevant text from the perspective web resources while filtering out text that clearly should not be used in the ontology (e.g., formatting data, structural data, metadata, JavaScript, etc.). Tokenized text files can be saved to an output directory 504 as specified by the user or automatically populated by the tool.

FIG. 6 illustrates a user interface 600 for displaying the information in the token data structures returned by the language analysis tool. In addition to displaying the POS, the original text, the stem, the lemma, and the language as described above, the data structure may also include information that characterizes the use of each token in the collection of web resources as a whole. For example, user interface 600 may display a field in the data structure that indicates the frequency 602, or number of occurrences, for each token in the collection of web resources. As will be described below, the frequency 602 of each token considered as a lemma can be used to filter the lemmas and thus identify tokens representing concepts for the ontology, while discarding tokens that do not represent useful concepts.

In some embodiments, the tool can pause after the language analysis tool has returned token data structures with the information displayed in user interface 600, and this information can then be presented to a user. At this point, the user can perform a manual filtering operation before lemmas are generated from the tokens. A selection box 604 can be provided for each token such that a users can easily select or deselect each token for consideration as a lemma. For example, in FIG. 6, the adjective token "now" has been deselected for further consideration because it is unlikely to be used to describe a useful concept in the ontology. In contrast, the noun token "now" remains selected because it is more likely to describe a useful concept the ontology. In some embodiments, tokens labeled with certain POS's can be automatically selected/deselected by user interface 600. For example, some embodiments may automatically deselect some verb forms from further consideration because they are unlikely to be used in lemmas representing useful concepts. After certain tokens have been deselected by a user or by an automatic process, the tokens listed in interface 600 can be used to form lemmas. It should be noted at this point in the process that the POS identified by interface 600 may have been automatically mapped from the POS provided by the language analysis tool to a POS from the standardized POS taxonomy as described above. Thus, the POS identified by interface 600 may represent a POS convention that can be used across various languages.

FIG. 7 illustrates a user interface 700 representing N-gram lemmas of various lengths, according to some embodiments. In order to generate multi-word lemmas, the system can combine tokens that appear together in the original text of the web resources in 1-, 2-, 3-, . . . N-word combinations. User interface 700 illustrates a table of N-grams formed from the original text. The table can include a column 704 that specifies the length of each n-gram. In order to generate N-grams of various lengths, a predefined variable can be assigned a value of the maximum length for each N-gram. In this example, the predefined variable would be assigned a value of at least 6. In some embodiments, the tool can then generate every possible N-gram from the original text by iteratively generating every possible set of consecutive tokens that are 1-, 2-, 3-, . . . N-words in length. In some embodiments, tokens that have been previously eliminated by the process can be excluded, thus limiting the number of N-grams generated.

Interface 700 can also display a POS for each multi-word combination. Column 701 indicates a POS for the N-gram as a whole. Column 702 indicates a POS for each individual token that is used to construct the N-gram. Note that the POS's indicated by column 701 and column 702 are from the standardized POS taxonomy described above. The POS indications in column 702 form a descriptive pattern for each multi-word N-gram that can be used to filter N-grams as will be described below. In generating the N-grams, the process can include punctuation from the original text. Column 706 displays the N-grams as extracted from the original web resources, including punctuation. Column 708 shows the actual lemma constructed from the original text that removes punctuation and tokens that should not be included in lemmas. Finally, column 710 indicates the stem of each word in the multi-word lemma as returned by the language analysis tool as described above.

After generating the list of multi-word lemmas displayed in column 708 of user interface 700, a dictionary of candidate lemmas has been formed. Generally, every word in a corpus is not useful in generating the ontology, and certain tokens were eliminated earlier in this process. Similarly, the dictionary of candidate lemmas at this stage also includes lemmas that will not be useful for an ontology. This is particularly true because multi-word N-grams were formed using all possible combinations of tokens from the original text. This would clearly lead to a bloated list of candidate lemmas that could be dominated by useless combinations of tokens.

In order to distill the list of candidate lemmas down to a useful size, some embodiments may employ manual and/or automatic methods of filtering candidate lemmas. At this stage, interface 700 can be presented to a user, and the user can make manual selections of N-grams that should be eliminated by deselecting lemmas in column 712 that are not believed to be useful. The presentation of user interface 700 can be very beneficial because it provides users with all the information they need in order to make informed decisions about candidate lemmas. The POS, original text, stem tokens, and so forth, can allow a user to quickly eliminate some candidate lemmas that clearly do not belong. The advantages presented by user interface 700 can greatly increase the efficiency of manually filtering a small list of candidate lemmas. However, when dealing with a large dictionary of candidate lemmas, this manual process of filtering the dictionary of candidate lemmas can be both error-prone and time-consuming. Therefore, the embodiments described herein allow users to generate filtering rules that automatically filter the dictionary of candidate lemmas down to a much more usable set of candidate lemmas. After an automatic filtering process takes place, the user can then manually filter a much smaller and accurate list of candidate lemmas.

FIG. 8 illustrates an interface 800 for designing lemma filters, according to some embodiments. Multiple filters may be designed and run against the same dictionary of candidate lemmas. Interface 800 can be used to design a single filter that can be used alone or in series with other filters designed by user interface 800 to either identify valid lemmas or to identify invalid lemmas. In one sense, the options provided by interface 800 can allow designer to specify either broadly or narrowly a particular type of lemma that should be identified by the filter definition. It will be understood that other options may be presented for designing a lemma filter, and therefore those presented by interface 800 are merely exemplary and not meant to be limiting.

In some embodiments, the frequency with which a lemma appears in the original source text can be used as a filtering metric. A minimum frequency 802 can be provided as part of the filter definition to eliminate lemmas that do not occur at least a minimum number of times as defined by the minimum frequency 802. This has the practical effect of identifying concepts that appear in a document often enough to consider the associated concept for the ontology. Using the minimum frequency 802 can also identify typos or other artifacts in a text corpus that should be excluded from an ontology. Typos or other one-time errors are not likely to occur often, and thus they would be filtered by the minimum frequency 802. In contrast, high-frequency occurrences are more likely to indicate a term with a specialized meaning or another concept that should be represented in the ontology.

In some embodiments, text patterns can be created using literal text, punctuation, wildcard symbols, and so forth. An original text pattern 804 can be used to specify words and phrases in the original text that a designer knows should be included in an ontology. For example, interface 800 shows a pattern for the original text 804 of "Oracle.*Service." This text pattern would generally identify any Oracle® service mentioned in the text as a lemma for the ontology. For example, this would include "Oracle® customer service", "Oracle® cloud services", "Oracle® database services", and so forth. In addition to being able to filter the original text using text patterns, the stems and lemmas for the original text can also be used in the filter by using a stem pattern 806 and a lemma pattern 808 provided by interface 800. Using lemmas or stems will allow users to capture all text and lemmas that are derived from stem versions of a concept. Text patterns can be very useful in identifying company names, product names, service names, common issues, and so forth.

Some web resources may include multiple languages. When scraping the text, the process may ingest all tokens regardless of language. The particular language of an individual token can be identified by the language analysis tool as described above. The POS for individual tokens in individual languages can then be mapped to the standardized POS taxonomy described above. However, in may cases, an ontology will only need to deal with a single language. In cases where multiple languages are detected in the dictionary of candidate lemmas, language control 810 can be used to select languages that should be filtered.

Many words (particularly in the English language) may have different meanings depending on their POS. For example, the noun "bow" could describe a part of a boat or a weapon. The verb "bow" could describe an action taken by a person. The adjective "bow" could be used to describe a characteristic of a piece of wood. When presented as a lemma, each of these three uses of the word "bow" would constitute a unique lemma with a unique POS. A POS control 812 in interface 800 can be used to select among various possible lemmas with different POS's. A multiword POS control 814 can be used to select a POS for a combination of single-word lemmas that form a multiword lemma. For example, a multiword lemma can representing a noun can be made up of a noun, adjective, and punctuation. In interface 800, the term "UNK" represents a wildcard for unknown parts of speech or punctuation.

As described above, the POS's of individual lemmas within a multi-word lemma can be used to describe acceptable word patterns when filtering candidate lemmas. A lemma pattern control 816 can be used to select word patterns (e.g., "noun adjective noun") that will describe acceptable candidate lemmas. In some embodiments, the lemma pattern control 816 can be automatically populated with multi-word lemma patterns that exist in the dictionary of candidate lemmas. In some embodiments, the lemma pattern control 816 can be dynamically adjusted to include only lemmas that match the other constraints for this particular filter as defined by interface 800. By default, all known patterns for multiword lemmas in the dictionary of candidate lemmas may be presented and selected. The filter designer is then given the option to deselect any patterns that are unlikely to match valid lemmas for the ontology.

A lemma count control 818 can also be provided by interface 800 to control the acceptable word count of each multiword lemma. As described above, a variable can be set that limits the word count in candidate lemmas generated in interface 700. Continuing with that example, the candidate dictionary includes lemmas up to 6 tokens in length. The lemma count control 818 can further limit the types of multiword lemmas that should proceed to the ontology. In the example of FIG. 8, the original text pattern 804 would seem to indicate that only lemmas at least three words in length would be acceptable. In this case, the filter designer would likely deselect any N-grams less than three lemmas in length.

As stated above, interface 800 can be used to define many different single filters. The particular filter of FIG. 8 is designed to identify lemmas referring to Oracle® services. In real-world applications, it is likely that many different filters will be designed to generate a single ontology. In some cases, library of predefined filters can be stored for a single client that uses consistent terminology throughout its various webpages. As web domains change, ontologies may need to be updated and regenerated. When filter rules are defined and stored in a library, the ontology can be quickly updated by simply scraping the web domain for new text content and running the ingested tokens through this process described above to generate a final list of lemmas for the ontology.

FIG. 9 illustrates a user interface 900 for generating a final list of lemmas for the ontology, according to some embodiments. At this point, the dictionary of candidate lemmas will have been filtered by the automatic filtering process of FIG. 8, and can now be manually filtered using the selection controls 902 of interface 900. Interface 900 gives a user a final opportunity to examine the list of candidate lemmas to identify any spurious inclusions that should be eliminated before generating a final dictionary of lemmas for the ontology. Note that this stage of manual filtering will come after the automatic filtering stage, which will leave the user a much more concise and accurate list on which to perform final manual filtering. Note that if the dictionary of candidate lemmas was manually filtered prior to the automatic filtering process, that manual filtering would most likely be performed on a much larger and inaccurate list, and would also likely filter many candidate lemmas that would be filtered by the automatic filtering process anyway. Thus, the automatic filtering process should reduce the amount of manual filtering required, as well as increasing its accuracy.

Figure 10:
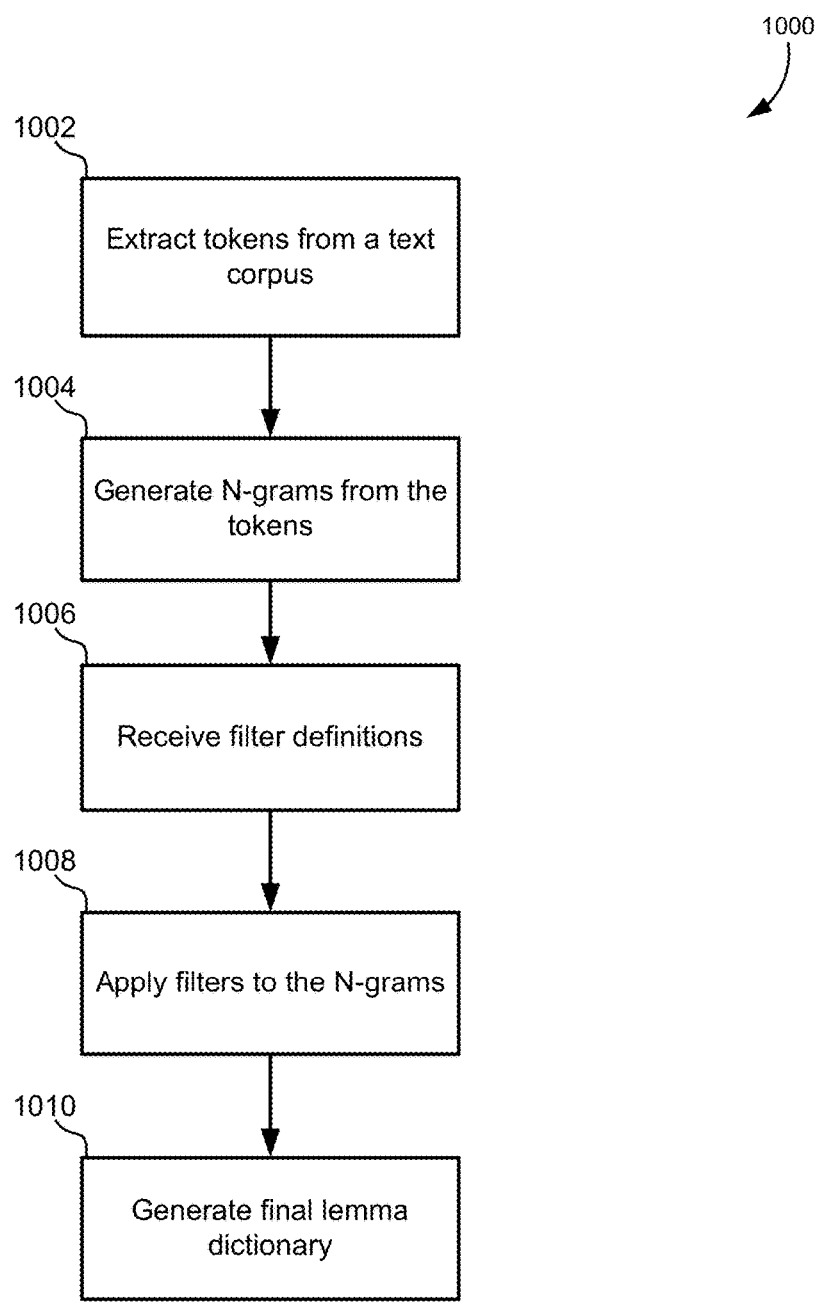
FIG. 10 illustrates a flowchart the method of automatically generating a lemma dictionary from a text corpus, according to some embodiments.

FIG. 10 illustrates a flowchart 1000 the method of automatically generating a lemma dictionary from a text corpus, according to some embodiments. The method in flowchart 1000 summarizes the steps described above, and will be understood to include any of the embodiments are features described in this disclosure. The method may include extracting tokens from a text corpus (1002). The text corpus may include a web resource, such as a web domain made up of different text-based documents, such as HTML webpages, PDFs, CSS stylesheets, JavaScript, and so forth. When extracting tokens from the text corpus, the process may identify and/or eliminate structural and/or formatting text that should not be included in the ontology.

The method may also include generating a set of N-grams from the set of tokens (1004). The N-grams may be generated by combining tokens into strings as they originally appeared in a text of the corpus. The N-grams may be built from original text, from lemmas, or from word stems identified by the language analysis tool. The method may also include receiving one or more filter definitions (1006). As described in detail above, the filter definitions may include POS patterns for individual tokens in a multiword N-gram. The filter definitions may also include text patterns with literal text and/or wildcards that operate on original text, stems, and/or lemmas within the n-gram. The filter definitions may also include a selection of a language and/or a minimum frequency for an N-gram to appear in the web resource. The filter definition may also include allowable lengths for (or number or words in) an N-gram.

The method may further include applying the one or more filter definitions to the set of N-grams (1008). In practice, any number of filters may be applied serially or in parallel to the set of N-grams in order to generate the final lemma dictionary. In some embodiments, a user interface may be presented that allows users to perform an additional step of manually filtering N-grams before/after the automatic filtering processes takes place. Finally, the method may include generating a final lemma dictionary (1010). The final lemma dictionary can then be used to generate an ontology by establishing relationships between the lemmas.

It should be appreciated that the specific steps illustrated in FIG. 10 provide particular methods of generating lemmas according to various embodiments of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
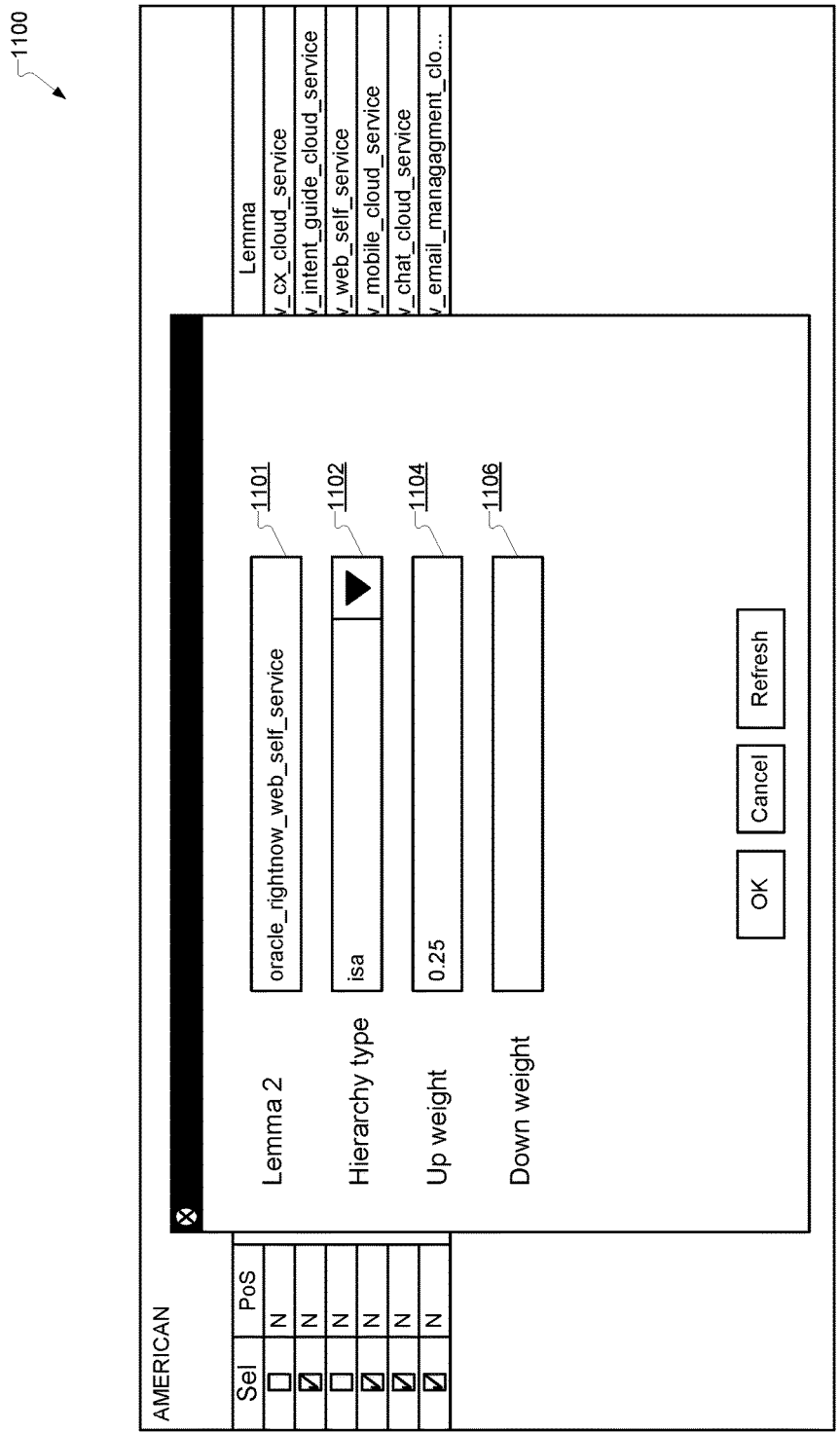
FIG. 11 illustrates a text-based user interface for establishing relationships between lemmas, according to some embodiments.

Some embodiments may offer different options for generating relationships between lemmas. FIG. 11 illustrates a text-based user interface 1100 for establishing relationships between lemmas, according to some embodiments. User interface 1100 allows a user to manually assign a relationship between two lemmas in the final lemma dictionary. When a first lemma is selected, interface 1100 allows the user to select a second lemma 1101 such that a relationship is established between the first lemma and the second lemma. The user is provided with a means for selecting different types of ontology relationships that may be established between the first lemma and the second lemma. For example, a control 1102 can allow a user to establish an "is-a" relationship, a "has-a" relationship, an "is-part-of" relationship, and so forth.

For ontologies that are going to be used as part of a search engine or knowledge management system for identifying information in response to user queries, additional information can be embedded within the ontology relationships to provide further information for search engine. Interface 1100 includes an "up weight" 1104 and a "down weight" 1106 that can be associated with a single relationship between two lemmas. The up weight 1104 and the down weight 1106 can be used to inform a search engine as it traverses the ontology tree to locate response of content. For example, for a relationship between the lemma "cloud service" and the lemma "data storage", both an up weight 1104, such as 0.5, and a down weight 1106, such as 1.0, can be established using interface 1100. When a search query is received for the web domain from which the ontology is generated, the up weight 1104 and the down weight 1106 can be used as penalty multipliers that are applied to a search score when traversing that relationship. For example, if a user submits a query for "cloud service", the search engine could retrieve documents classified under the "cloud service" node of the ontology. Additionally, the search engine could retrieve documents classified under nodes adjacent to the "cloud service" node in the ontology, and penalize these additional results based on the up/down weight of the relationship traversed. For example, if the search engine traversed its way down the ontology from "cloud service" to "data storage", the down weight of 1.0 would be applied to the results classified under the "data storage" node of the ontology. Conversely, if the query was for "data storage", then results classified under the "cloud service" node of the ontology would be penalized the up weight 1104 of 0.5. The up weight 1104 and the down weight 1106 allow designers the ability to establish relationships that have different search penalties depending on the direction in which the relationship is traversed.

Figure 12:
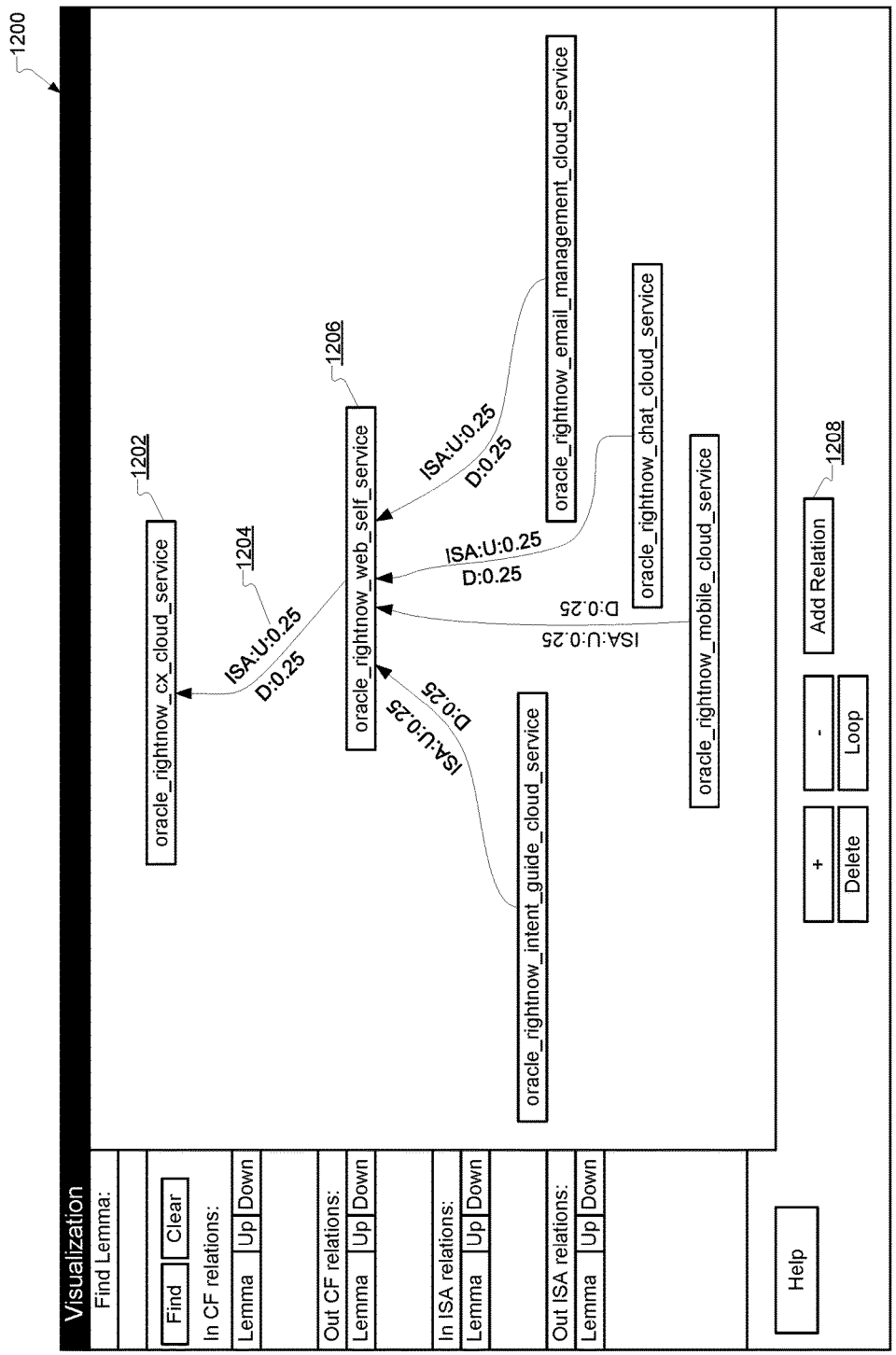
FIG. 12 illustrates a user interface for graphically representing and manipulating an ontology, according to some embodiments.

FIG. 12 illustrates a user interface 1200 for graphically representing and manipulating an ontology, according to some embodiments. Interface 1200 displays a graph representing the ontology. The nodes (1202, 1206) in the graph represent lemmas from the lemma dictionary derived from the process described above. The connections (1204) between nodes in the graph represent relationships between the nodes (1202, 1206). Each of the relationships can be labeled with the type of relationship (e.g., "is-a"), a directionality indicated by an arrow, and the up weight and down weight assigned to the relationship. By displaying information from the ontology in a graph format, users can quickly assess how lemmas are related to each other through relationships. Specifically, it can be visually apparent how much of a search penalty will be applied as multiple generations of the ontology are traversed. It can also be visually apparent how changes to the ontology relationships will affect the concept groupings as a whole.

User interface 1200 not only provides a graphical representation of the ontology, but it also allows for the graphical manipulation and establishment of relationships in the ontology. For example, two nodes can be selected, and control 1208 can be used to add a relationship between those two nodes. Similarly, relationships can be connected, disconnected, and reassigned graphically using inputs, such as mouse inputs.

In some embodiments, relationships between lemmas can be generated automatically without requiring manual connections from a user input. In one case, relationships between N-grams can be automatically generated when those N-grams textually build on each other. For example, N-grams that represent a token subset of another N-grams can be assigned a parent-child arrangement the ontology. "Data storage" could be assigned as a parent node to "cloud data storage." In another case, lemmas extracted from similar locations in the web resource can automatically be visually grouped together by user interface 1200. For example, all of the lemmas from a single webpage could be grouped together visually in interface 1200. This would allow a user to see a grouping of lemmas that can then be easily connected together with relationships. In another case, structural or formatting data in a web resource can be used to automatically generate relationships. For example, an HTML table with a header row can automatically establish relationships between lemmas representing the headers and lemmas representing text in the respective columns beneath the headers. In another case, the proximity of lemmas as they appear in the original text can be used to automatically group nodes together in interface 1200. For example, lemmas that appear in the same sentence or paragraph will be grouped closely together in interface 1200.

In addition to generating a single ontology in a given language, the methods described herein can also be used as part of a process for generating additional ontologies in different languages using a base ontology (e.g., an English ontology). In short, the concepts, or lemmas in the base ontology can be mapped to corresponding concepts in other languages. Lemmas representing these concepts in other languages can then be connected using the same relationships established in the base ontology. In consequence, a new ontology can be generated almost entirely from an automatic process without requiring the manual labor involved with establishing and verify relationships between lemmas that are extracted from the text corpus.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 13:
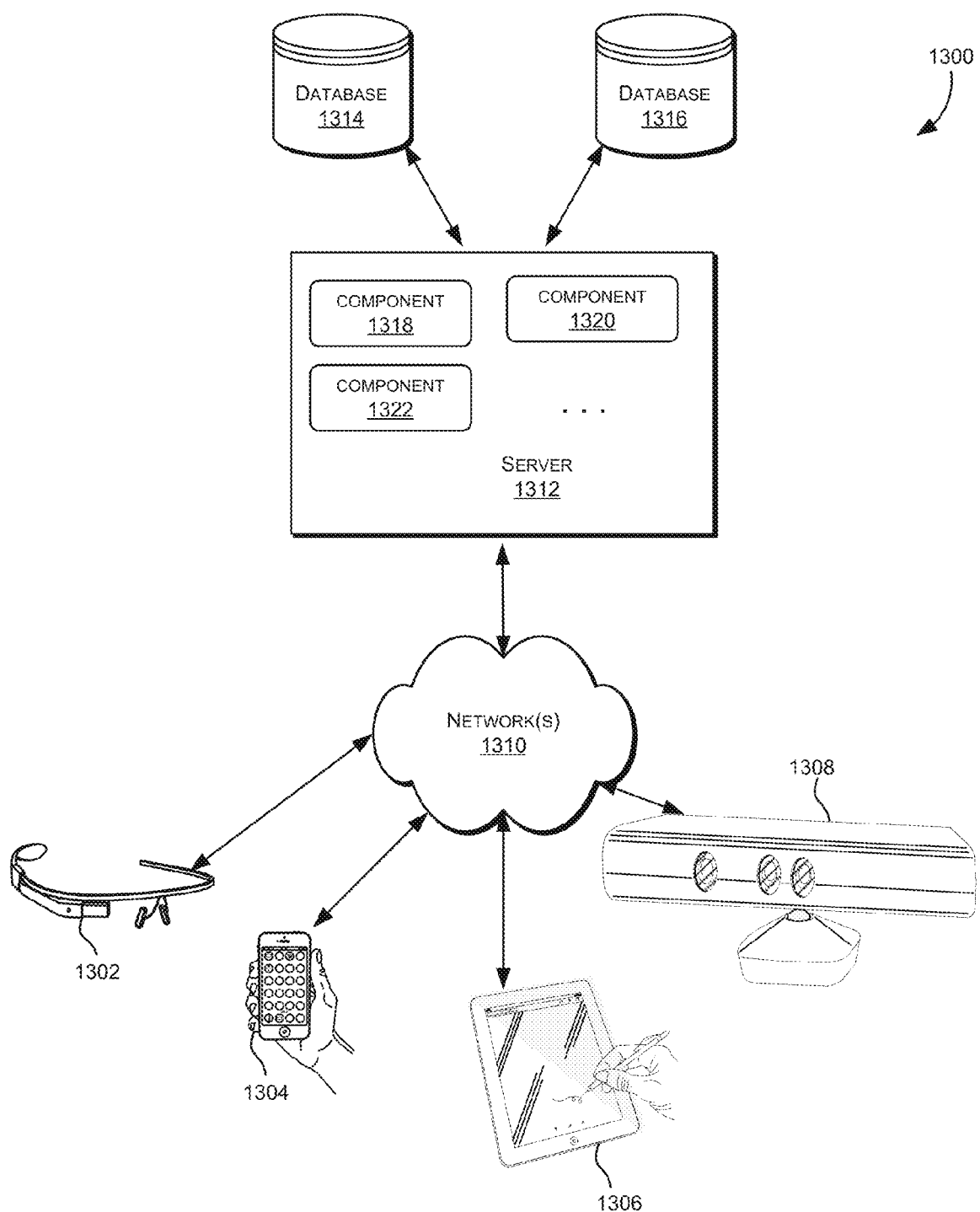
FIG. 13 illustrates a simplified block diagram of a distributed system for implementing some of the embodiments.

FIG. 13 depicts a simplified diagram of a distributed system 1300 for implementing one of the embodiments. In the illustrated embodiment, distributed system 1300 includes one or more client computing devices 1302, 1304, 1306, and 1308, which are configured to execute and operate a client application such as a web browser, proprietary client (e.g., Oracle Forms), or the like over one or more network(s) 1310. Server 1312 may be communicatively coupled with remote client computing devices 1302, 1304, 1306, and 1308 via network 1310.

In various embodiments, server 1312 may be adapted to run one or more services or software applications provided by one or more of the components of the system. In some embodiments, these services may be offered as web-based or cloud services or under a Software as a Service (SaaS) model to the users of client computing devices 1302, 1304, 1306, and/or 1308. Users operating client computing devices 1302, 1304, 1306, and/or 1308 may in turn utilize one or more client applications to interact with server 1312 to utilize the services provided by these components.

In the configuration depicted in the figure, the software components 1318, 1320 and 1322 of system 1300 are shown as being implemented on server 1312. In other embodiments, one or more of the components of system 1300 and/or the services provided by these components may also be implemented by one or more of the client computing devices 1302, 1304, 1306, and/or 1308. Users operating the client computing devices may then utilize one or more client applications to use the services provided by these components. These components may be implemented in hardware, firmware, software, or combinations thereof. It should be appreciated that various different system configurations are possible, which may be different from distributed system 1300. The embodiment shown in the figure is thus one example of a distributed system for implementing an embodiment system and is not intended to be limiting.

Client computing devices 1302, 1304, 1306, and/or 1308 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1302, 1304, 1306, and 1308 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1310.

Although exemplary distributed system 1300 is shown with four client computing devices, any number of client computing devices may be supported. Other devices, such as devices with sensors, etc., may interact with server 1312.

Network(s) 1310 in distributed system 1300 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1310 can be a local area network (LAN), such as one based on Ethernet, Token-Ring and/or the like. Network(s) 1310 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1312 may be adapted to run one or more services or software applications described in the foregoing disclosure. For example, server 1312 may correspond to a server for performing processing described above according to an embodiment of the present disclosure.

Server 1312 may run an operating system including any of those discussed above, as well as any commercially available server operating system. Server 1312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1312 may include one or more applications to analyze and consolidate data feeds and/or event updates received from users of client computing devices 1302, 1304, 1306, and 1308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1312 may also include one or more applications to display the data feeds and/or real-time events via one or more display devices of client computing devices 1302, 1304, 1306, and 1308.

Distributed system 1300 may also include one or more databases 1314 and 1316. Databases 1314 and 1316 may reside in a variety of locations. By way of example, one or more of databases 1314 and 1316 may reside on a non-transitory storage medium local to (and/or resident in) server 1312. Alternatively, databases 1314 and 1316 may be remote from server 1312 and in communication with server 1312 via a network-based or dedicated connection. In one set of embodiments, databases 1314 and 1316 may reside in a storage-area network (SAN). Similarly, any necessary files for performing the functions attributed to server 1312 may be stored locally on server 1312 and/or remotely, as appropriate. In one set of embodiments, databases 1314 and 1316 may include relational databases, such as databases provided by Oracle, that are adapted to store, update, and retrieve data in response to SQL-formatted commands.

Figure 14:
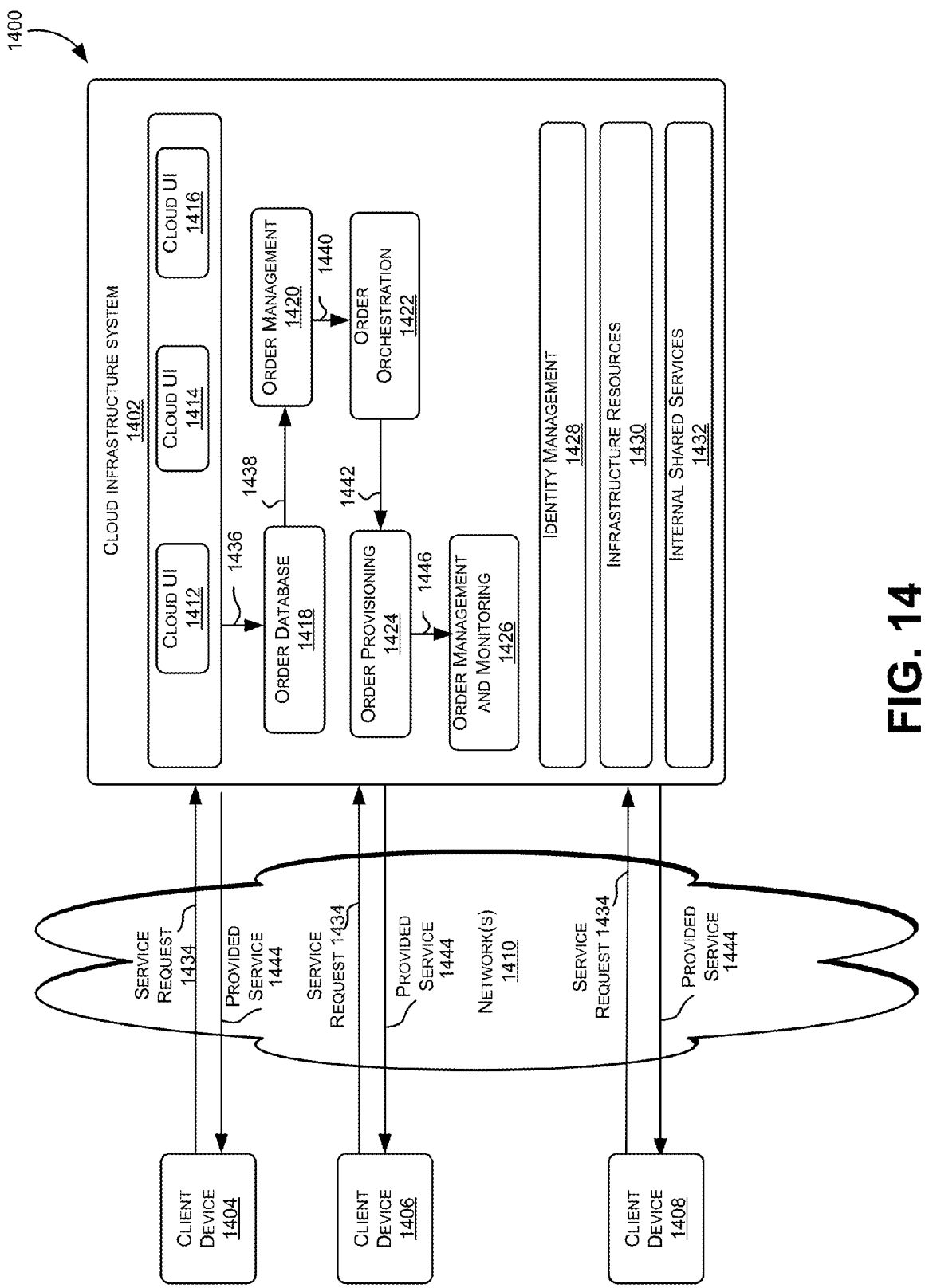
FIG. 14 illustrates a simplified block diagram of components of a system environment by which services provided by the components of an embodiment system may be offered as cloud services.

FIG. 14 is a simplified block diagram of one or more components of a system environment 1400 by which services provided by one or more components of an embodiment system may be offered as cloud services, in accordance with an embodiment of the present disclosure. In the illustrated embodiment, system environment 1400 includes one or more client computing devices 1404, 1406, and 1408 that may be used by users to interact with a cloud infrastructure system 1402 that provides cloud services. The client computing devices may be configured to operate a client application such as a web browser, a proprietary client application (e.g., Oracle Forms), or some other application, which may be used by a user of the client computing device to interact with cloud infrastructure system 1402 to use services provided by cloud infrastructure system 1402.

It should be appreciated that cloud infrastructure system 1402 depicted in the figure may have other components than those depicted. Further, the embodiment shown in the figure is only one example of a cloud infrastructure system that may incorporate an embodiment of the invention. In some other embodiments, cloud infrastructure system 1402 may have more or fewer components than shown in the figure, may combine two or more components, or may have a different configuration or arrangement of components.

Client computing devices 1404, 1406, and 1408 may be devices similar to those described above for 1302, 1304, 1306, and 1308.

Although exemplary system environment 1400 is shown with three client computing devices, any number of client computing devices may be supported. Other devices such as devices with sensors, etc. may interact with cloud infrastructure system 1402.

Network(s) 1410 may facilitate communications and exchange of data between clients 1404, 1406, and 1408 and cloud infrastructure system 1402. Each network may be any type of network familiar to those skilled in the art that can support data communications using any of a variety of commercially-available protocols, including those described above for network(s) 1310.

Cloud infrastructure system 1402 may comprise one or more computers and/or servers that may include those described above for server 1312.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1402 may be adapted to automatically provision, manage and track a customer's subscription to services offered by cloud infrastructure system 1402. Cloud infrastructure system 1402 may provide the cloud services via different deployment models. For example, services may be provided under a public cloud model in which cloud infrastructure system 1402 is owned by an organization selling cloud services (e.g., owned by Oracle) and the services are made available to the general public or different industry enterprises. As another example, services may be provided under a private cloud model in which cloud infrastructure system 1402 is operated solely for a single organization and may provide services for one or more entities within the organization. The cloud services may also be provided under a community cloud model in which cloud infrastructure system 1402 and the services provided by cloud infrastructure system 1402 are shared by several organizations in a related community. The cloud services may also be provided under a hybrid cloud model, which is a combination of two or more different models.

In some embodiments, the services provided by cloud infrastructure system 1402 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1402. Cloud infrastructure system 1402 then performs processing to provide the services in the customer's subscription order.

In some embodiments, the services provided by cloud infrastructure system 1402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1402 may also include infrastructure resources 1430 for providing the resources used to provide various services to customers of the cloud infrastructure system. In one embodiment, infrastructure resources 1430 may include pre-integrated and optimized combinations of hardware, such as servers, storage, and networking resources to execute the services provided by the PaaS platform and the SaaS platform.

In some embodiments, resources in cloud infrastructure system 1402 may be shared by multiple users and dynamically re-allocated per demand. Additionally, resources may be allocated to users in different time zones. For example, cloud infrastructure system 1430 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1432 may be provided that are shared by different components or modules of cloud infrastructure system 1402 and by the services provided by cloud infrastructure system 1402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1402 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1402, and the like.

In one embodiment, as depicted in the figure, cloud management functionality may be provided by one or more modules, such as an order management module 1420, an order orchestration module 1422, an order provisioning module 1424, an order management and monitoring module 1426, and an identity management module 1428. These modules may include or be provided using one or more computers and/or servers, which may be general purpose computers, specialized server computers, server farms, server clusters, or any other appropriate arrangement and/or combination.

In exemplary operation 1434, a customer using a client device, such as client device 1404, 1406 or 1408, may interact with cloud infrastructure system 1402 by requesting one or more services provided by cloud infrastructure system 1402 and placing an order for a subscription for one or more services offered by cloud infrastructure system 1402. In certain embodiments, the customer may access a cloud User Interface (UI), cloud UI 1412, cloud UI 1414 and/or cloud UI 1416 and place a subscription order via these UIs. The order information received by cloud infrastructure system 1402 in response to the customer placing an order may include information identifying the customer and one or more services offered by the cloud infrastructure system 1402 that the customer intends to subscribe to.

After an order has been placed by the customer, the order information is received via the cloud UIs, 1412, 1414 and/or 1416.

At operation 1436, the order is stored in order database 1418. Order database 1418 can be one of several databases operated by cloud infrastructure system 1418 and operated in conjunction with other system elements.

At operation 1438, the order information is forwarded to an order management module 1420. In some instances, order management module 1420 may be configured to perform billing and accounting functions related to the order, such as verifying the order, and upon verification, booking the order.

At operation 1440, information regarding the order is communicated to an order orchestration module 1422. Order orchestration module 1422 may utilize the order information to orchestrate the provisioning of services and resources for the order placed by the customer. In some instances, order orchestration module 1422 may orchestrate the provisioning of resources to support the subscribed services using the services of order provisioning module 1424.

In certain embodiments, order orchestration module 1422 enables the management of business processes associated with each order and applies business logic to determine whether an order should proceed to provisioning. At operation 1442, upon receiving an order for a new subscription, order orchestration module 1422 sends a request to order provisioning module 1424 to allocate resources and configure those resources needed to fulfill the subscription order. Order provisioning module 1424 enables the allocation of resources for the services ordered by the customer. Order provisioning module 1424 provides a level of abstraction between the cloud services provided by cloud infrastructure system 1400 and the physical implementation layer that is used to provision the resources for providing the requested services. Order orchestration module 1422 may thus be isolated from implementation details, such as whether or not services and resources are actually provisioned on the fly or pre-provisioned and only allocated/assigned upon request.

At operation 1444, once the services and resources are provisioned, a notification of the provided service may be sent to customers on client devices 1404, 1406 and/or 1408 by order provisioning module 1424 of cloud infrastructure system 1402.

At operation 1446, the customer's subscription order may be managed and tracked by an order management and monitoring module 1426. In some instances, order management and monitoring module 1426 may be configured to collect usage statistics for the services in the subscription order, such as the amount of storage used, the amount data transferred, the number of users, and the amount of system up time and system down time.

In certain embodiments, cloud infrastructure system 1400 may include an identity management module 1428. Identity management module 1428 may be configured to provide identity services, such as access management and authorization services in cloud infrastructure system 1400. In some embodiments, identity management module 1428 may control information about customers who wish to utilize the services provided by cloud infrastructure system 1402. Such information can include information that authenticates the identities of such customers and information that describes which actions those customers are authorized to perform relative to various system resources (e.g., files, directories, applications, communication ports, memory segments, etc.) Identity management module 1428 may also include the management of descriptive information about each customer and about how and by whom that descriptive information can be accessed and modified.

Figure 15:
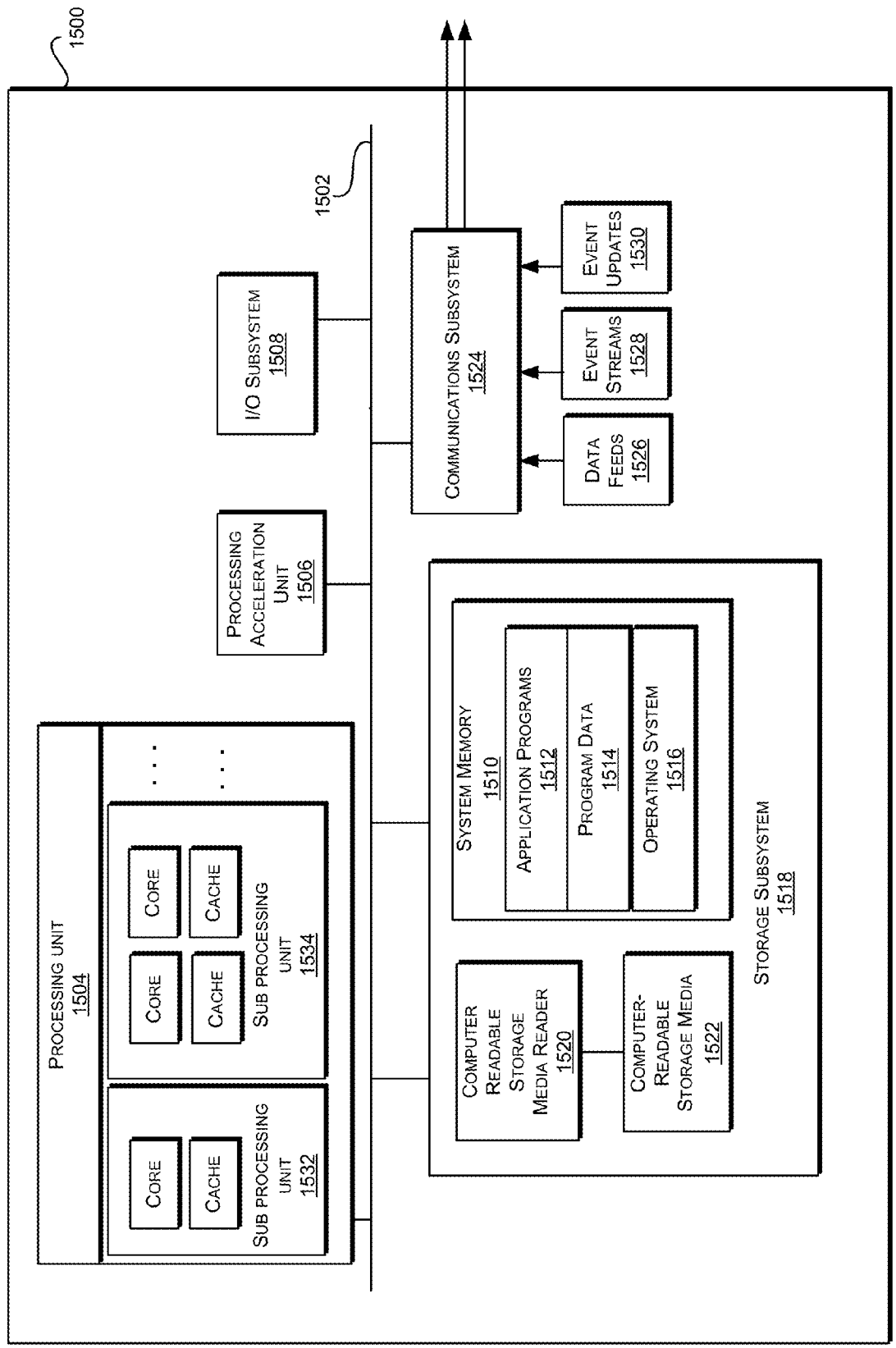
FIG. 15 illustrates an exemplary computer system, in which various embodiments may be implemented.

FIG. 15 illustrates an exemplary computer system 1500, in which various embodiments of the present invention may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1518 may also provide a tangible computer-readable storage medium for storing the basic programming and data constructs that provide the functionality of some embodiments. Software (programs, code modules, instructions) that when executed by a processor provide the functionality described above may be stored in storage subsystem 1518. These software modules or instructions may be executed by processing unit 1504. Storage subsystem 1518 may also provide a repository for storing data used in accordance with the present invention.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of generating ontologies for a Virtual Assistant across different languages, the method comprising:
    extracting a plurality of tokens in a first language from a plurality of web resources in a web domain that includes the Virtual Assistant, wherein the web resources are made available in a first language and a second language;
    determining a first part-of-speech (POS) for each of the plurality of tokens, wherein the first POS is specific to the first language;
    loading a mapping file that is specific to the first language, wherein the mapping file maps each POS in the first language to an entry in a table, wherein each entry in the table comprises a POS that is general across the first language and the second language;
    mapping, for each of the plurality of tokens, the first POS to a second POS from the table using the mapping file;
    generating a plurality of lemmas from the plurality of tokens; and
    causing a network of nodes to be displayed, wherein each node in the network of nodes represents one of the plurality of lemmas, and connections between the nodes in the network of nodes represents conceptual relationships between the plurality of lemmas.

2. The method of claim 1 wherein the plurality of tokens are extracted from a plurality of different document formats in the plurality of web resources.

3. The method of claim 2 further comprising executing scripts specific to each of the different document formats to extract the plurality of tokens.

4. The method of claim 1 further comprising:
    generating a first ontology comprising the plurality of lemmas the conceptual relationships between the plurality of lemmas.

5. The method of claim 4 further comprising providing the first ontology to the Virtual Assistant for answering user queries.

6. The method of claim 4 further comprising:
    extracting a second plurality of tokens in the second language from the plurality of web resources;
    determining a third POS for each of the second plurality of tokens, wherein the third POS is specific to the second language;
    mapping, for each of the second plurality of tokens, the third POS to a fourth POS from the table using the mapping file;
    generating a second plurality of lemmas from the second plurality of tokens; and
    mapping the conceptual relationships between the plurality of lemmas to the second plurality of lemmas to generate a second ontology specific to the second language.

7. The method of claim 6 wherein the network of nodes includes additional nodes representing the second plurality of lemmas such that relationships between plurality of lemmas and the second plurality of lemmas are displayed.

8. A non-transitory, computer-readable medium comprising instructions which, when executed by one or more processors, causes the one or more processors to perform operations comprising:
    extracting a plurality of tokens in a first language from a plurality of web resources in a web domain that includes a Virtual Assistant, wherein the web resources are made available in a first language and a second language;

determining a first part-of-speech (POS) for each of the plurality of tokens, wherein the first POS is specific to the first language;

loading a mapping file that is specific to the first language, wherein the mapping file maps each POS in the first language to an entry in a table, wherein each entry in the table comprises a POS that is general across the first language and the second language;

mapping, for each of the plurality of tokens, the first POS to a second POS from the table using the mapping file;

generating a plurality of lemmas from the plurality of tokens; and causing a network of nodes to be displayed, wherein each node in the network of nodes represents one of the plurality of lemmas, and connections between the nodes in the network of nodes represents conceptual relationships between the plurality of lemmas.

9. The non-transitory, computer-readable medium of claim 8 wherein the plurality of tokens are extracted from a plurality of different document formats in the plurality of web resources.

10. The non-transitory, computer-readable medium of claim 9 wherein the instructions cause the one or more processors to perform additional operations comprising executing scripts specific to each of the different document formats to extract the plurality of tokens.

11. The non-transitory, computer-readable medium of claim 8 wherein the instructions cause the one or more processors to perform additional operations comprising:

generating a first ontology comprising the plurality of lemmas the conceptual relationships between the plurality of lemmas.

12. The non-transitory, computer-readable medium of claim 11 wherein the instructions cause the one or more processors to perform additional operations comprising providing the first ontology to the Virtual Assistant for answering user queries.

13. The non-transitory, computer-readable medium of claim 11 wherein the instructions cause the one or more processors to perform additional operations comprising:

extracting a second plurality of tokens in the second language from the plurality of web resources;

determining a third POS for each of the second plurality of tokens, wherein the third POS is specific to the second language;

mapping, for each of the second plurality of tokens, the third POS to a fourth POS from the table using the mapping file;

generating a second plurality of lemmas from the second plurality of tokens; and mapping the conceptual relationships between the plurality of lemmas to the second plurality of lemmas to generate a second ontology specific to the second language.

14. The non-transitory, computer-readable medium of claim 13 wherein the network of nodes includes additional nodes representing the second plurality of lemmas such that relationships between plurality of lemmas and the second plurality of lemmas are displayed.

15. A system comprising:

one or more processors; and one or more memory devices comprising instructions which, when executed by the one or more processors, cause the one or more processors to perform operations comprising:

extracting a plurality of tokens in a first language from a plurality of web resources in a web domain that includes a Virtual Assistant, wherein the web resources are made available in a first language and a second language;

determining a first part-of-speech (POS) for each of the plurality of tokens, wherein the first POS is specific to the first language;

loading a mapping file that is specific to the first language, wherein the mapping file maps each POS in the first language to an entry in a table, wherein each entry in the table comprises a POS that is general across the first language and the second language;

mapping, for each of the plurality of tokens, the first POS to a second POS from the table using the mapping file;

generating a plurality of lemmas from the plurality of tokens; and causing a network of nodes to be displayed, wherein each node in the network of nodes represents one of the plurality of lemmas, and connections between the nodes in the network of nodes represents conceptual relationships between the plurality of lemmas.

16. The system of claim 15 wherein the instructions cause the one or more processors to perform additional operations comprising:

generating a first ontology comprising the plurality of lemmas the conceptual relationships between the plurality of lemmas.

17. The system of claim 16 wherein the instructions cause the one or more processors to perform additional operations comprising:

extracting a second plurality of tokens in the second language from the plurality of web resources;

determining a third POS for each of the second plurality of tokens, wherein the third POS is specific to the second language;

mapping, for each of the second plurality of tokens, the third POS to a fourth POS from the table using the mapping file;

generating a second plurality of lemmas from the second plurality of tokens; and mapping the conceptual relationships between the plurality of lemmas to the second plurality of lemmas to generate a second ontology specific to the second language.

18. The system of claim 17 wherein the network of nodes includes additional nodes representing the second plurality of lemmas such that relationships between plurality of lemmas and the second plurality of lemmas are displayed.

* * * * *

UNITED STATES PATENT AND TRADEMARK OFFICE
CERTIFICATE OF CORRECTION

PATENT NO. : 9,842,102 B2  
APPLICATION NO. : 14/793701  
DATED : December 12, 2017  
INVENTOR(S) : Salome et al.

Page 1 of 1

It is certified that error appears in the above-identified patent and that said Letters Patent is hereby corrected as shown below:

In the Drawings

On sheet 4 of 15, in FIG. 4, Line 4, delete "Nomalized" and insert -- Normalized --, therefor.

In the Specification

In Column 1, Line 14, delete "Univerasal" and insert -- Universal --, therefor.

In Column 3, Line 63, delete "be be" and insert -- be --, therefor.

In Column 4, Line 62, delete "Assitant" and insert -- Assistant --, therefor.

In Column 11, Line 10, delete "length l" and insert -- length 1 --, therefor.

In Column 13, Line 65, delete "in may" and insert -- in many --, therefor.

Signed and Sealed this  
Third Day of July, 2018

Andrei Iancu  
*Director of the United States Patent and Trademark Office*